US007593346B2

(12) United States Patent
McLaggan et al.

(10) Patent No.: US 7,593,346 B2
(45) Date of Patent: Sep. 22, 2009

(54) DISTRIBUTING AND BALANCING TRAFFIC FLOW IN A VIRTUAL GATEWAY

(75) Inventors: Douglas McLaggan, Edinburgh (GB); Ian Herbert Wilson, Edinburgh (GB); Mark A. Denny, San Jose, CA (US); Rick L. Williams, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 749 days.

(21) Appl. No.: 10/632,704

(22) Filed: Jul. 31, 2003

(65) Prior Publication Data

US 2005/0025179 A1 Feb. 3, 2005

(51) Int. Cl.
*H04L 1/00* (2006.01)
*H04L 12/26* (2006.01)
*H04L 12/28* (2006.01)
*H04L 12/56* (2006.01)

(52) U.S. Cl. .................. 370/252; 370/253; 370/395.54; 370/392; 370/401; 370/404

(58) Field of Classification Search ................ 370/252, 370/253, 392, 401–404, 468, 400, 230, 230.1, 370/231–235, 396, 395.54, 395.3, 395.31
See application file for complete search history.

(56) References Cited

U.S. PATENT DOCUMENTS

| 4,692,918 A | 9/1987 | Elliott et al. .................. 370/85 |
| 4,827,411 A | 5/1989 | Arrowood et al. | |

(Continued)

FOREIGN PATENT DOCUMENTS

WO  WO98/31107  7/1998

OTHER PUBLICATIONS

Release notes for 3Com Corporation, "NETBuilder Family Bridge/Router", pp. 27-29, (Mar. 1994).

(Continued)

*Primary Examiner*—Chi H Pham
*Assistant Examiner*—Farah Faroul
(74) *Attorney, Agent, or Firm*—Weaver Austin Villeneuve & Sampson LLP

(57) ABSTRACT

The distribution of traffic flows in a load-sharing redundancy group that includes a first gateway device and a second gateway device includes assigning a first set of forwarding addresses to the first gateway device and a second set of forwarding addresses to the second gateway device. The redundancy group distributes forwarding addresses to hosts which in turn use the distributed forwarding addresses to send packets to the redundancy group. The traffic flow for each of the assigned forwarding addresses is measured and may be compared to a target traffic flow. The traffic flow is adjusted to close in on the target traffic flow. Adjustment of the traffic flow can be accomplished either by changing the existing measured traffic flow by re-assigning a forwarding address originally assigned to one gateway device to a different gateway device or by altering future distribution of forwarding addresses so that additional traffic is sent to one or more forwarding addresses having lower measured traffic. The gateway devices can be routers using virtual Media Access Control (MAC) addresses as forwarding addresses. The redundancy group may also be configured to provide failover services in the event that one of the gateway devices ceases operation.

49 Claims, 7 Drawing Sheets

U.S. PATENT DOCUMENTS

| | | |
|---|---|---|
| 4,965,772 A | 10/1990 | Daniel et al. |
| 5,016,244 A | 5/1991 | Massey, Jr. et al. ............ 370/16 |
| 5,018,133 A | 5/1991 | Tsukakoshi et al. ........... 370/16 |
| 5,218,600 A | 6/1993 | Schenkyr et al. .............. 370/16 |
| 5,371,852 A | 12/1994 | Attanasio et al. ............ 395/200 |
| 5,414,704 A | 5/1995 | Spinney ........................ 370/60 |
| 5,423,002 A | 6/1995 | Hart |
| 5,452,447 A | 9/1995 | Nelson et al. |
| 5,473,599 A | 12/1995 | Li et al. ........................ 370/16 |
| 5,488,412 A | 1/1996 | Majeti et al. .................. 348/10 |
| 5,506,987 A | 4/1996 | Abramson et al. ........... 718/103 |
| 5,511,208 A | 4/1996 | Boyles et al. |
| 5,515,429 A | 5/1996 | Kawada et al. |
| 5,541,911 A | 7/1996 | Nilakantan et al. |
| 5,544,320 A | 8/1996 | Konrad |
| 5,555,244 A | 9/1996 | Gupta et al. |
| 5,572,528 A | 11/1996 | Shuen ........................ 370/85.1 |
| 5,586,121 A | 12/1996 | Moura et al. ................. 370/404 |
| 5,611,049 A | 3/1997 | Pitts |
| 5,619,552 A | 4/1997 | Karppanen et al. ............ 379/60 |
| 5,644,713 A | 7/1997 | Makishima |
| 5,644,720 A | 7/1997 | Boll et al. |
| 5,673,265 A | 9/1997 | Gupta et al. |
| 5,729,537 A | 3/1998 | Billstrom ..................... 370/329 |
| RE35,774 E | 4/1998 | Moura et al. ................... 348/12 |
| 5,740,375 A | 4/1998 | Dunne et al. |
| 5,751,971 A | 5/1998 | Dobbins et al. |
| 5,774,660 A | 6/1998 | Brandel et al. |
| 5,787,470 A | 7/1998 | DiSimone et al. |
| 5,793,763 A | 8/1998 | Mayes et al. ................. 370/389 |
| 5,818,845 A | 10/1998 | Moura et al. ................. 370/449 |
| 5,825,759 A | 10/1998 | Liu .............................. 370/331 |
| 5,828,655 A | 10/1998 | Moura et al. ................. 370/236 |
| 5,835,696 A | 11/1998 | Hess |
| 5,848,241 A | 12/1998 | Misinai et al. |
| 5,852,717 A | 12/1998 | Bhide et al. |
| 5,859,852 A | 1/1999 | Moura et al. ................. 370/449 |
| 5,862,345 A | 1/1999 | Okanoue et al. ............... 33/365 |
| 5,862,451 A | 1/1999 | Grau et al. ..................... 455/5.1 |
| 5,872,773 A | 2/1999 | Katzela et al. ............... 370/256 |
| 5,892,903 A | 4/1999 | Klaus ....................... 395/187.1 |
| 5,940,596 A | 8/1999 | Rajan et al. |
| 5,943,604 A | 8/1999 | Chen et al. ..................... 455/5.1 |
| 5,946,047 A | 8/1999 | Levan ......................... 348/473 |
| 5,946,048 A | 8/1999 | Levan ......................... 348/473 |
| 5,949,753 A | 9/1999 | Alexander et al. |
| 5,950,205 A | 9/1999 | Aviani, Jr. ................... 707/103 |
| 5,953,335 A | 9/1999 | Erimli et al. ................. 370/390 |
| 5,956,346 A | 9/1999 | Levan ......................... 370/480 |
| 5,959,660 A | 9/1999 | Levan ......................... 348/12 |
| 5,959,968 A | 9/1999 | Chin et al. ................... 370/216 |
| 5,959,997 A | 9/1999 | Moura et al. ................. 370/404 |
| 5,963,540 A | 10/1999 | Bhaskaran |
| 5,982,745 A | 11/1999 | Wolff et al. |
| 5,989,060 A | 11/1999 | Coile et al. .................. 439/489 |
| 5,996,016 A | 11/1999 | Thalheimer et al. |
| 5,996,021 A | 11/1999 | Civaniar et al. |
| 5,999,536 A | 12/1999 | Kawafuji et al. |
| 6,006,264 A | 12/1999 | Colby et al. |
| 6,006,266 A | 12/1999 | Murphy, Jr. et al. ......... 709/227 |
| 6,016,388 A | 1/2000 | Dillon .................... 395/200.72 |
| 6,052,718 A | 4/2000 | Gifford ....................... 709/219 |
| 6,058,425 A | 5/2000 | White |
| 6,061,650 A | 5/2000 | Malkin et al. |
| 6,065,061 A | 5/2000 | Blahut et al. |
| 6,073,168 A | 6/2000 | Migdoll et al. |
| 6,078,575 A | 6/2000 | Dommety et al. ........... 370/338 |
| 6,088,721 A | 7/2000 | Lin et al. |
| 6,092,178 A | 7/2000 | Jindal et al. |
| 6,097,882 A | 8/2000 | Mogul |
| 6,108,300 A | 8/2000 | Coile et al. |
| 6,111,675 A | 8/2000 | Mao et al. |
| 6,128,666 A | 10/2000 | Muller et al. |
| 6,131,121 A | 10/2000 | Mattaway et al. |
| 6,148,000 A | 11/2000 | Feldman et al. |
| 6,148,410 A | 11/2000 | Baskey et al. |
| 6,157,965 A | 12/2000 | Mohammed et al. |
| 6,167,438 A | 12/2000 | Yates et al. |
| 6,167,446 A | 12/2000 | Lister et al. |
| 6,173,312 B1 | 1/2001 | Atarashi et al. |
| 6,182,139 B1 | 1/2001 | Brendel |
| 6,189,043 B1 | 2/2001 | Buyukkoc et al. |
| 6,189,102 B1 | 2/2001 | Beser |
| 6,195,705 B1 | 2/2001 | Leung ........................ 709/245 |
| 6,202,169 B1 | 3/2001 | Razzaghe-Ashrafi |
| 6,205,481 B1 | 3/2001 | Heddaya et al. |
| 6,230,196 B1 | 5/2001 | Guenthner et al. |
| 6,230,326 B1 | 5/2001 | Unger et al. |
| 6,236,678 B1 | 5/2001 | Horton et al. ............... 375/222 |
| 6,240,089 B1 | 5/2001 | Okanoue et al. |
| 6,240,461 B1 | 5/2001 | Cieslak et al. |
| 6,243,360 B1 | 6/2001 | Basilico |
| 6,243,760 B1 | 6/2001 | Armbruster et al. |
| 6,247,054 B1 | 6/2001 | Malkin |
| 6,249,820 B1 | 6/2001 | Dobbins et al. |
| 6,253,234 B1 | 6/2001 | Hunt et al. |
| 6,260,070 B1 | 7/2001 | Shah .......................... 709/230 |
| 6,286,084 B1 | 9/2001 | Wexler et al. |
| 6,292,832 B1 | 9/2001 | Shah et al. .................. 709/226 |
| 6,295,276 B1 | 9/2001 | Datta et al. |
| 6,298,063 B1 | 10/2001 | Coile et al. |
| 6,298,381 B1 | 10/2001 | Shah et al. .................. 709/228 |
| 6,301,223 B1 | 10/2001 | Hrastar et al. |
| 6,324,564 B1 | 11/2001 | Thieke et al. |
| 6,327,622 B1 | 12/2001 | Jindal et al. |
| 6,330,602 B1 | 12/2001 | Law et al. |
| 6,339,830 B1 | 1/2002 | See et al. |
| 6,345,294 B1 | 2/2002 | O'Toole et al. ............. 709/222 |
| 6,370,147 B1 | 4/2002 | Beser |
| 6,377,972 B1 | 4/2002 | Guo et al. |
| 6,385,204 B1 | 5/2002 | Hoefelmeyer et al. |
| 6,389,027 B1 | 5/2002 | Lee et al. |
| 6,389,462 B1 | 5/2002 | Cohen et al. |
| 6,397,260 B1 | 5/2002 | Wils et al. |
| 6,415,323 B1 | 7/2002 | McCanne et al. |
| 6,434,608 B1 | 8/2002 | Desai |
| 6,438,123 B1 | 8/2002 | Chapman |
| 6,442,558 B1 | 8/2002 | Brown et al. |
| 6,446,121 B1 | 9/2002 | Shah et al. .................. 709/224 |
| 6,449,249 B1 | 9/2002 | Cloonan et al. |
| 6,449,250 B1 | 9/2002 | Otani et al. ................. 370/219 |
| 6,463,475 B1 | 10/2002 | Calhoun |
| 6,466,964 B1 | 10/2002 | Leung et al. |
| 6,470,027 B1 | 10/2002 | Birrell, Jr. |
| 6,470,389 B1 | 10/2002 | Chung et al. |
| 6,473,802 B2 | 10/2002 | Masters |
| 6,477,197 B1 | 11/2002 | Unger |
| 6,477,522 B1 | 11/2002 | Young |
| 6,480,469 B1 | 11/2002 | Moore et al. |
| 6,487,591 B1 | 11/2002 | Budhraja et al. |
| 6,493,318 B1 | 12/2002 | Bare |
| 6,499,088 B1 | 12/2002 | Wexler et al. |
| 6,505,254 B1 | 1/2003 | Johnson et al. ............. 709/239 |
| 6,510,162 B1 | 1/2003 | Fijolek et al. |
| 6,510,469 B1 | 1/2003 | Starnes et al. |
| 6,512,774 B1 | 1/2003 | Vepa et al. .................. 370/401 |
| 6,519,646 B1 | 2/2003 | Gupta et al. |
| 6,532,493 B1 | 3/2003 | Aviani et al. |
| 6,553,568 B1 | 4/2003 | Fijolek et al. |
| 6,556,591 B2 | 4/2003 | Bernath et al. |
| 6,577,642 B1 | 6/2003 | Fijolek et al. |
| 6,578,066 B1 | 6/2003 | Logan et al. |
| 6,578,077 B1 | 6/2003 | Rakoshitz et al. |
| 6,588,016 B1 | 7/2003 | Chen et al. |

| | | | |
|---|---|---|---|
| 6,594,305 | B1 | 7/2003 | Roeck et al. |
| 6,598,232 | B1 | 7/2003 | McAlear |
| 6,606,315 | B1 | 8/2003 | Albert et al. |
| 6,606,352 | B2 | 8/2003 | Horton et al. |
| 6,611,868 | B1 | 8/2003 | Arutyunov |
| 6,621,810 | B1 | 9/2003 | Leung |
| 6,633,585 | B1 * | 10/2003 | Ghanwani et al. ............ 370/468 |
| 6,636,498 | B1 | 10/2003 | Leung |
| 6,636,971 | B1 | 10/2003 | Loukianov |
| 6,650,624 | B1 | 11/2003 | Quigley et al. |
| 6,650,641 | B1 | 11/2003 | Albert |
| 6,665,304 | B2 | 12/2003 | Beck et al. |
| 6,671,259 | B1 | 12/2003 | He et al. |
| 6,674,713 | B1 | 1/2004 | Berg et al. |
| 6,683,873 | B1 | 1/2004 | Kwok et al. |
| 6,687,217 | B1 | 2/2004 | Chow et al. |
| 6,691,165 | B1 | 2/2004 | Bruck et al. |
| 6,728,748 | B1 | 4/2004 | Mangipudi et al. |
| 6,735,631 | B1 | 5/2004 | Oehrke et al. |
| 6,742,044 | B1 | 5/2004 | Aviani et al. |
| 6,751,191 | B1 | 6/2004 | Kanekar et al. ............. 370/221 |
| 6,760,302 | B1 | 7/2004 | Ellinas et al. |
| 6,760,316 | B1 | 7/2004 | Hebsgaard et al. |
| 6,765,892 | B1 | 7/2004 | Leung et al. |
| 6,779,039 | B1 | 8/2004 | Bommareddy et al. ...... 709/238 |
| 6,789,125 | B1 | 9/2004 | Aviani et al. |
| 6,795,857 | B1 | 9/2004 | Leung et al. |
| 6,801,949 | B1 | 10/2004 | Bruck et al. ................ 709/232 |
| 6,804,221 | B1 | 10/2004 | Magret et al. |
| 6,826,599 | B1 | 11/2004 | Shaffer et al. |
| 6,832,252 | B1 | 12/2004 | Cieslak et al. |
| 6,839,809 | B1 | 1/2005 | Forster et al. |
| 6,839,829 | B1 | 1/2005 | Woundy et al. |
| 6,857,026 | B1 | 2/2005 | Cain |
| 6,885,667 | B1 | 4/2005 | Wilson et al. |
| 6,920,498 | B1 | 7/2005 | Gourlay et al. |
| 6,952,401 | B1 * | 10/2005 | Kadambi et al. ............ 370/232 |
| 6,981,056 | B1 | 12/2005 | Aviani et al. |
| 7,006,431 | B1 | 2/2006 | Kanekar et al. |
| 7,039,720 | B2 | 5/2006 | Alfieri et al. |
| 7,058,007 | B1 | 6/2006 | Zang et al. |
| 7,062,570 | B2 | 6/2006 | Hong et al. |
| 7,065,043 | B2 * | 6/2006 | Wu et al. .................... 370/229 |
| 7,068,712 | B1 | 6/2006 | Zang et al. |
| 7,072,979 | B1 | 7/2006 | Aviani et al. |
| 7,111,061 | B2 | 9/2006 | Leighton et al. |
| 7,136,383 | B1 | 11/2006 | Wilson |
| 7,143,195 | B2 | 11/2006 | Vange et al. |
| 7,149,217 | B2 * | 12/2006 | Alexander et al. .......... 370/392 |
| 7,151,758 | B2 | 12/2006 | Kumaki et al. |
| 7,162,540 | B2 | 1/2007 | Jasen et al. |
| 7,260,102 | B2 | 8/2007 | Mehvar et al. |
| 7,349,979 | B1 | 3/2008 | Cieslak et al. |
| 7,395,348 | B1 | 7/2008 | Cieslak et al. |
| 7,401,159 | B1 | 7/2008 | Aviani et al. |
| 2001/0042105 | A1 | 11/2001 | Koehler et al. |
| 2001/0049741 | A1 | 12/2001 | Skene et al. |
| 2002/0010783 | A1 | 1/2002 | Primak et al. |
| 2002/0012327 | A1 | 1/2002 | Okada |
| 2002/0120697 | A1 | 8/2002 | Generous et al. ............ 709/206 |
| 2003/0014540 | A1 | 1/2003 | Sultan et al. |
| 2003/0031178 | A1 * | 2/2003 | Haeri et al. ................. 370/392 |
| 2003/0037165 | A1 * | 2/2003 | Shinomiya .................. 709/238 |
| 2003/0133420 | A1 | 7/2003 | Haddad |
| 2004/0071141 | A1 | 4/2004 | Dhara et al. |
| 2005/0111352 | A1 | 5/2005 | Ho et al. |
| 2005/0213832 | A1 | 9/2005 | Schofield et al. |

OTHER PUBLICATIONS

J. Moy, RFC 1247 "OSPF Version 2", Jul. 19, 1991.
D. Oran, RFC 1142 "OSI IS-IS Intra-domain Routing Protocol", Feb. 1990.
Black, Uyless, "TCP/IP and Related Protocols", McGraw-Hill, Inc., pp. 226-249, 1992.
T. Li, et al., RFC 2281 "Cisco Hot Standby Router Protocol (HSRP)," Mar. 1998.
K. Egevang et al., "The IP Network Address Translator (NAT)", Network Working Group, pp. 1-10, May 1994.
Y. Rekhter, et al, "*Address Allocation for Private Internets*," RFC: 1918, Network Working Group, Feb. 1996, 9 Pages.
P. Srisuresh, et al, "*Load Sharing Using IP Network Address Translation (LSNAT)*," RFC: 2391, Network Working Group, Aug. 1998, 18 Pages.
P. Srisuresh, et al, "*IP Network Address Translator (NAT) Terminology and Considerations*," RFC: 2663, Network Working Group, Aug. 1999, 30 Pages.
E. Gerich, "*Guidelines for Management of IP Address Space*," RFC: 1466, Network Working Group, May 1993, 10 Pages.
Chambless, et al., "Home Agent Redundancy Protocol (Harp)," Oct. 27, 1997.
Network Working Group, RFC 2002 "IP Mobility Support," Oct. 1996.
Jayasenan, et al. "*Stateful Network Address Translation Protocol Implemented Over a Data Network*," U.S. Appl. No. 09/735,199, filed Dec. 11, 2000, 67 Pages.
Leung, et al. "*Method and Apparatus for Implementing Home Agent Redundancy*," U.S. Appl. No. 10/008,494, filed Nov. 9, 2001, 53 Pages.
Kent Leung, "*Mobile IP Mobility Agent Standby Protocol*,"U.S. Appl. No. 09/714,466, filed Nov. 14, 2000, 51 Pages.
C.E. Perkins and T. Jagannadh, "*DHCP for Mobile Networking with TCP/IP*," IBM, Watson Research Center IEEE, Apr. 1995.
Eager et al., "Adaptive Load Sharing in Homogeneous Distributed Systems," IEEE, Transactions on Software Engineering, vol. Se-12, No. 5, May 1986, pp. 662-675.
Akamai Technologies, Inc. -Global Internet Content Delivery-"How FreeFlow Works," webmaster@akamai.com 1999-2000.
Digital Island, Inc. -e-Business Without Limits-, "Enabling Technologies," http://www.digisle.net. No date.
Internap, "Preferred Collocation Services," http://www.internap.com Copyright © 2001 Internap Network Services Corporation.
D. Farinacci, et al., Request For Comments No. 2784, entitled, "Generic Routing Encapsulation (GRE)," Mar. 2000, Network Working Group, 9 pages.
Mockapetris, P., Request For Comments No. 1034, entitled, "Domain Names—Concepts and Facilities," Nov. 1987, Internet Engineering Task Force, 31 pages.
Information Sciences Institute, Request for Comments No. 793, entitled, "Transmission Control Protocol—DARPA Internet Program—Protocol Specification,"Sep. 1981, Internet Engineering Task Force, 49 pages.
David M. Gifford, "Replica Routing," U.S. Appl. No. 09/472,964, Filed Dec. 28, 1999, 37 pages.
Lu et al., "Automatic Network Addresses Assignment and Translation Interference," U.S. Appl. No. 60/160,535, filed Oct. 20, 1999, 127 pages.
Lu et al., "Method and Apparatus for Automatic Network Address Assignment," U.S. Appl. No. 60/178,063, filed Jan. 24, 2000, 74 Pages.
Johnson et al., "Method and Apparatus for Determining a Network Topology in the Presence of Network Address Translation," U.S. Appl. No. 60/178,062, filed Jan. 24, 2000, 32 Pages.
Toole et al., "Fast-Changing Network Status and Load Monitoring and Feedback," U.S. Appl. No. 60/177,985, filed Jan. 25, 2000, 20 Pages.
Kirk Johnson, "A Method and Apparatus for Minimalist Approach to Implementing Server Selection," U.S. Appl. No. 60/177,415, filed Jan. 21, 2000, 39 Pages.
3Com Corporation, "Configuring Boundary Routing System Architecture," NETBuilder Family Bridge/Router Release Notes, Mar. 1994, pp. 26-29.
Dhaval N. Shah, "A System and Method for Selecting Service with Dynamically Changing Information," U.S. Appl. No. 09/287,213, filed Apr. 5, 1999, 57 pages.

Swenson et al., "System and Method for Resolving an Electronic Address," U.S. Appl. No. 09/234,928, filed Jan. 21, 1999, 26 Pages.
Nosella et al., "Gateway Load Balancing Protocol," U.S. Appl. No. 09/883,674, filed Jun. 18, 2001, 48 Pages.
Nosella et al., U.S. Appl. No. 09/883,674, filed Jun. 18, 2001, Office Action dated May 3, 2005.
European Patent Examination Report dated Oct. 13, 2006, from related Foreign Patent Application No. 04 755 658.4, 5 pages.
European Office Action dated Jan. 7, 2008 from corresponding EP Application No. 04755658.4 3 pages.
Office Action dated Mar. 17, 1995 for U.S. Appl. No. 08/231,330.
Notice of Allowance dated Jul. 24, 1995 for U.S. Appl. No. 08/231,330.
Allowed Claims for U.S. Appl. No. 08/231,330.
International Search Report mailed on Aug. 24, 1995 for PCT Application No. PCT/US1995/04887.
Office Action dated Feb. 2, 2000 for U.S. Appl. No. 09/107,701.
Notice of Allowance dated Aug. 14, 2000 for U.S. Appl. No. 09/107,701.
Allowed Claims for U.S. Appl. No. 09/107,701.
Release notes for 3Com Corporation, "Conducting a Redundant Route for Network Resiliency," *NETBuilder Family Bridge/Router Release*, Mar. 1994, pp. 26-29.
Office Action for U.S. Appl. No. 09/714,466, dated Jun. 4, 2001.
Office Action for U.S. Appl. No. 09/714,466, dated Nov. 27, 2001.
Notice of allowance for U.S. Appl. No. 09/714,466, dated May 21, 2002.
Allowed Claims for U.S. Appl. No. 09/714,466.
Meyer et al., Request for Comments No. 2026, entitled, "Generic Routing Encapsulation (GRE)," Jan. 2000, Internet Engineering Task Force, 9 pages.
Office Action dated Nov. 15, 2002 for U.S. Appl. No. 09/342,859.
Final Office Action dated May 7, 2003 for U.S. Appl. No. 09/342,859.
Notice of Allowance dated Aug. 4, 2003 for U.S. Appl. No. 09/342,859.
Supplemental Notice of Allowance dated Oct. 3, 2003 for U.S. Appl. No. 09/342,859.
Allowed Claims for U.S. Appl. No. 09/342,859.
Office Action dated Dec. 15, 2004 for U.S. Appl. No. 10/723,371.
Notice of Allowance dated May 3, 2005 for U.S. Appl. No. 10/723,371.
Supplemental Notice of Allowance dated Sep. 15, 2005 for U.S. Appl. No. 10/723,371.
Allowed Claims for U.S. Appl. No. 10/723,371.
S. Knight et al. "Virtual Redundancy Protocol", Apr. 1998, IETF, RFC 2338.
Office action dated Nov. 18, 2002 for U.S. Appl. No. 09/484,189.
Final Office action dated Apr. 21, 2003 for U.S. Appl. No. 09/484,189.
Office action dated Dec. 8, 2003 for U.S. Appl. No. 09/484,189.
Notice of Allowance dated Apr. 15, 2004 for U.S. Appl. No. 09/484,189.
Allowed claims for U.S. Appl. No. 09/484,189.
Office Action dated Feb. 12, 2008 for U.S. Appl. No. 10/899,668.
Final Office Action dated Aug. 20, 2008 for U.S. Appl. No. 10/899,668.
Office Action dated Feb. 12, 2003 for U.S. Appl. No. 09/484,611.
Office Action dated Mar. 18, 2003 for U.S. Appl. No. 09/484,611.
Final Office Action dated Aug. 15, 2003 for U.S. Appl. No. 09/484,611.
Office Action dated Jan. 21, 2004 for U.S. Appl. No. 09/484,611.
Final Office Action dated Aug. 10, 2004 for U.S. Appl. No. 09/484,611.
Office Action dated Feb. 16, 2005 for U.S. Appl. No. 09/484,611.
Office Action dated Jul. 19, 2005 for U.S. Appl. No. 09/484,611.
Notice of Allowance dated Jan. 5, 2006 for U.S. appl. No. 09/484,611.
Allowed claims for U.S. Appl. No. 09/484,911.
Office Action dated Jan. 31, 2008 for U.S. Appl. No. 11/636,725.
Final Office Action dated Sep. 26, 2008 for U.S. Appl. No. 11/636,725.
Office Action dated Apr. 25, 2003 for U.S. Appl. No. 09/484,612.
Office Action dated Nov. 6, 2002 for U.S. Appl. No. 09/484,612.
Office Action dated Nov. 6, 2003 for U.S. Appl. No. 09/484,612.
Office Action dated Mar. 10, 2004 for U.S. Appl. No. 09/484,612.
Office Action dated Sep. 16, 2004 for U.S. Appl. No. 09/484,612.
Notice of Allowance dated Jun. 3, 2005 for U.S. Appl. No. 09/484,612.
Notice of Allowance dated Nov. 22, 2005 for U.S. Appl. No. 09/484,612.
Allowed claims for U.S. Appl. No. 09/484,612.
Office Action dated Apr. 10, 2003 for U.S. Appl. No. 09/476,188.
Notice of Allowance dated Sep. 8, 2003 for U.S. Appl. No. 09/476,188.
Allowed claims for U.S. Appl. No. 09/476,188.
Office Action dated Oct. 14, 2003 for U.S. Appl. No. 09/606,418.
Notice of Allowance dated Feb. 10, 2004 for U.S. Appl. No. 09/606,418.
Notice of Allowance dated Jul. 1, 2005 for U.S. Appl. No. 09/606,418.
Allowed claims for U.S. Appl. No. 09/606,418.
Valloppillil, Vinod, "Cache Array Routing Protocol v1.0", Oct. 20, 1997, Internet-Draft, http://ds1.internic/net/internet-drafts/draft-vinod-carp-v1-02.txt, pp. 1-6.
Cisco Technology, Inc., "Configuring IP Routing Protocols," Dec. 10, 1997, http://www.cisco.com/univercd/data/doc/software/11_2/cnp1/5ciprout.htm#REF40277, pp. 1-6, 120-122.
Ousterhout, John K., "*A Trace-Driven Analysis of the UNIX 4.2 BSD File System,*" Jan. 2, 1993, Computer Science Division, Electrical Engineering and Computer Science, University of California, Berkeley, CA, pp. 1-12.
Welch, Brent, "*A Comparison of the Vnode and Sprite File System Architectures,*" Proceedings of the File System Workshop, May 1992, pp. 29-44.
Ousterhout, John K., "*Beating the I/O Bottleneck: A Case for Log-Structured File Systems,*" Jan. 30, 1992, Computer Science Division, Electrical Engineering and Computer Sciences, University of California, Berkeley, CA, pp. 1-17.
Martin Arlitt, Ludmila Cherkasova, John Dilley, Rich Friedrich And Tai Jin, OF Hewlett-Packard Laboratories, "*Evaluating Content Management Techniques For Web Proxy Caches,*" Apr. 30, 1999, 9 pages.
Cardellini et al., "Dynamic Load Balancing on Web-Server Systems," Internet Computing, IEEE, May-Jun. 1993, vol. 3, Issue 3, pp. 28-39.
Asit Dan et al., "Multimedia Caching Strategies for Heterogeneous Application and Server Environments," Multimedia Tools and Application, May 1997, vol. 4, No. 3, pp. 379-312.
Gibson et al., "File Server Scaling with Network-Attached Secure Disks," *Association for Computing Machinery*, 1997, pp. 272-284.
Pai et al., "Locality-Aware Request Distribution in Cluster-based Network Servers," *Association for Computing Machinery*, 1998, pp. 205-216.
Perkins et al., "Route Optimization for Mobile IP," *Cluster Computing*, Jun. 1998 vol. 1, No. 2, pp. 161-176.
Office Action dated Dec. 2, 2003 for U.S. Appl. No. 09/608,802.
Office Action dated Mar. 15, 2004 for U.S. Appl. No. 09/608,802.
Final Office Action dated Dec. 1, 2004 for U.S. Appl. No. 09/608,802.
Office Action dated Sep. 20, 2005 for U.S. Appl. No. 09/608,802.
Final Office Action dated Mar. 2, 2006 for U.S. Appl. No. 09/608,802.
Office Action dated Sep. 6, 2006 for U.S. Appl. No. 09/608,802.
Final Office Action dated Jan. 30, 2007 for U.S. Appl. No. 09/608,802.
Notice of Allowance dated Oct. 25, 2007 for U.S. Appl. No. 09/608,802.
Allowed Claims for U.S. Appl. No. 09/608,802.
Gourlay et al., "Path Selection System," Filed: Dec. 19, 2001, U.S. Appl. No. 10/034,368.
Office Action dated Apr. 15, 2003 for U.S. Appl. No. 09/569,090.
Final Office Action dated Oct. 1, 2003 for U.S. Appl. No. 09/569,090.
Notice of Allowance dated Jan. 9, 2004 for U.S. Appl. No. 09/569,090.
Supplemental Notice of Allowance dated Mar. 12, 2004 for U.S. Appl. No. 09/569,090.

Allowed claims for U.S. Appl. No. 09/569,090.
Office Action for dated Sep. 24, 2007 U.S. Appl. No. 10/851,456.
Notice of Allowance dated Mar. 7, 2008 for U.S. Appl. No. 10/851,456.
Allowed claims for U.S. Appl. No. 10/851,456.
Office Action dated Oct. 6, 2003 for U.S. Appl. No. 09/569,083.
Interview Summary dated Jan. 30, 2004 for U.S. Appl. No. 09/569,083.
Notice of Allowance dated Apr. 29, 2004 for U.S. Appl. No. 09/569,083.
Allowed claims for U.S. Appl. No. 09/569,083.
Office Action dated Aug. 13, 2003 for U.S. Appl. No. 09/605,917.
Final Office Action dated Feb. 2, 2004 for U.S. Appl. No. 09/605,917.
Office Action dated Jul. 13, 2004 for U.S. Appl. No. 09/605,917.
Final Office Action dated Apr. 27, 2005 for U.S. Appl. No. 09/605,917.
Notice of Allowance dated Aug. 18, 2005 for U.S. Appl. No. 09/605,917.
Allowed claims for U.S. Appl. No. 09/605,917.
Office Action dated May 3, 2005 for U.S. Appl. No. 09/883,674.
Final Office Action dated Sep. 20, 2005 for U.S. Appl. No. 09/883,674.
Final Office Action dated Dec. 21, 2005, 2005 for U.S. Appl. No. 09/883,674.
Office Action dated Feb. 13, 2006 for U.S. Appl. No. 09/883,674.
International Search Report and Written Opinion mailed on Jul. 10, 2004 for PCT Application No. PCT/US2004/019617.
Office Action dated Apr. 20, 2004 for U.S. Patent Appl. No. 09/748,828.
Notice of Allowance dated Dec. 21, 2004 for U.S. Patent Appl. No. 09/748,828.
Allowed claims for U.S. Patent Appl. No. 09/748,828.
Office Action dated Nov. 29, 2005 for U.S. Appl. No. 11/083,727.
Final Office Action dated Apr. 4, 2006 for U.S. Appl. No. 11/083,727.
Notice Of Allowance dated Jun. 30, 2006 for U.S. Appl. No. 11/083,727.
Allowed claims for U.S. Appl. No. 11/083,727.
Office Action dated May 2, 2006 for U.S. Appl. No. 10/008,494.
Final Office Action dated Oct. 4, 2006 for U.S. Appl. No. 10/008,494.
Notice of Allowance dated Jan. 26, 2007 for U.S. Appl. No. 10/008,494.
Notice of allowance dated Mar. 27, 2007 for U.S. Appl. No. 10/008,494.
Allowed Claims for U.S. Appl. No. 10/008,494.
Office Action dated Jan. 7, 2008 from EP Patent Application No. 04755658.4.
Examination Report dated Oct. 13, 2006 from EP Patent Application No. 04755658.4.
Office Action dated Dec. 15, 2008 for Chinese Patent Application No. 200480021154.3

* cited by examiner

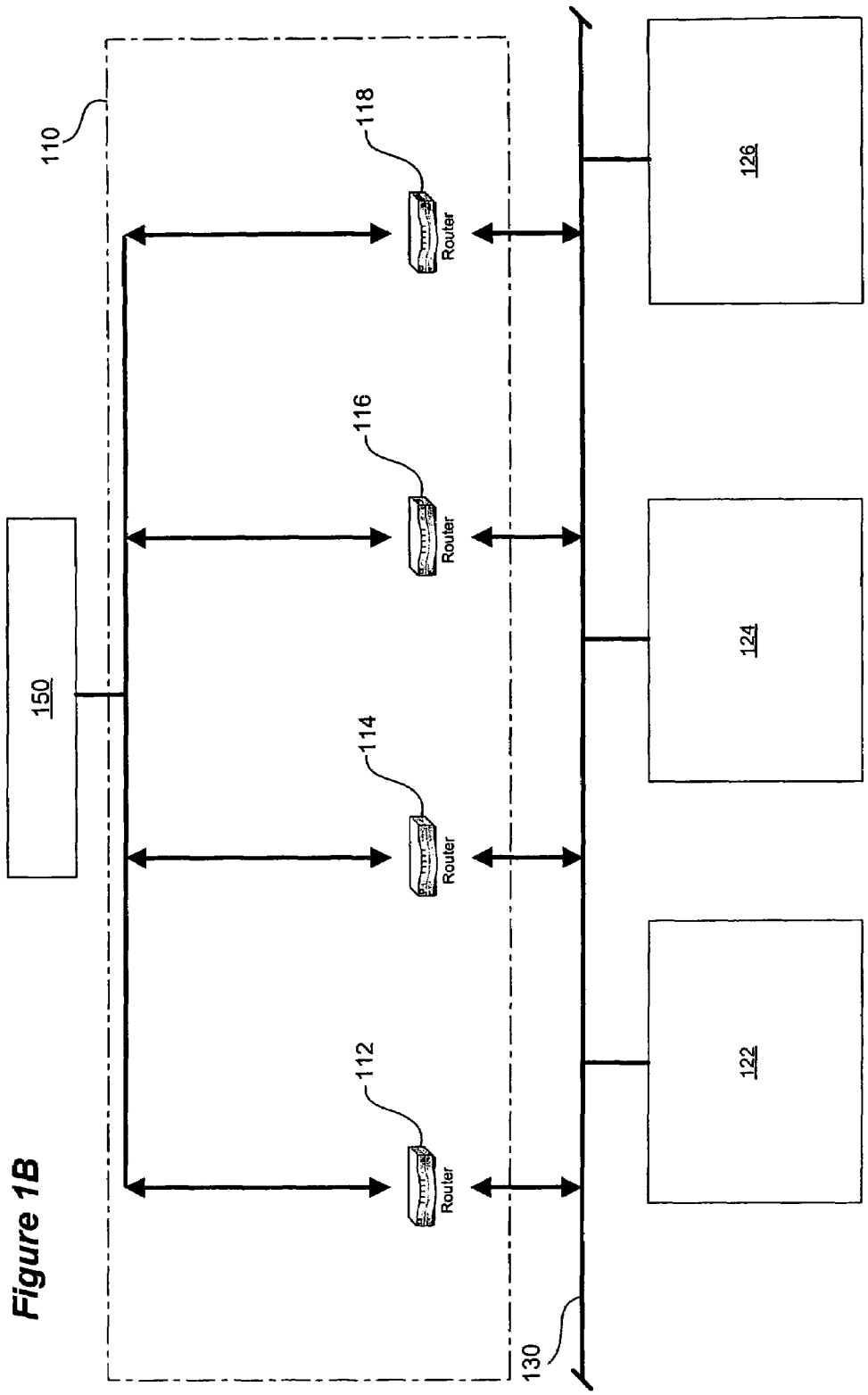

DISTRIBUTING AND BALANCING TRAFFIC FLOW IN A VIRTUAL GATEWAY

BACKGROUND OF THE INVENTION

The present invention relates generally to network systems using redundant or standby devices working together in a redundancy group and load distributing arrangement to provide a virtual router service. More particularly, the present invention relates to methods and apparatus for controlling the distribution of traffic flow across a gateway using multiple gateway devices that are acting as a virtual router.

Local area networks (LANs) are commonly connected with one another through one or more routers so that a host (a PC or other arbitrary LAN entity) on one LAN can communicate with other hosts on different LANs (that is, remote or external networks). Typically, a host is able to communicate directly only with the entities on its local LAN segment. When it needs to send a data packet to an address that it does not recognize as being local, it communicates through a router (or other layer-3 or gateway device) which determines how to direct the packet between the host and the destination address in a remote network. Unfortunately, a router may, for a variety of reasons, become inoperative after a "trigger event" (for example, a power failure, rebooting, scheduled maintenance, etc.). Such potential router failure has led to the development and use of redundant systems, which have more than one gateway device to provide a back up in the event of primary gateway device failure. When a gateway device fails in such a redundancy system, the host communicating through the inoperative gateway device may still remain connected to other LANs by sending packets to and through another gateway device connected to the host's LAN.

Logically, such a system can resemble FIG. 1A. In FIG. 1A, a local network 130 uses a single gateway router 110 to forward outbound packets for hosts 122, 124, 126 when those packets are bound for an outside network 150 (for example, the Internet). As seen in FIG. 1B, however, the actual physical configuration of a redundancy group system uses several routers 112, 114, 116, 118 to implement a redundancy group that functions as the single virtual gateway 110 for hosts 122, 124, 126.

Various protocols have been devised to allow a host to choose a router from among a group of routers in a network. Two of these, Routing Information Protocol (or RIP) and ICMP Router Discovery Protocol (IRDP) are examples of protocols that involve dynamic participation by the host. However, because both RIP and IRDP require that the host be dynamically involved in the router selection, performance may be reduced and special host modifications and management may be required.

In a widely used and somewhat simpler approach, the host recognizes only a single "default" router. Hosts (for example, workstations, users and/or data center servers) using the IP protocol utilize this default gateway to exit a local network and access remote networks. Therefore, each host must have prior knowledge of the gateway's IP address which typically is a router or layer-3 switch IP address. Hosts are either statically configured with the IP address of the default gateway or are assigned the address through a configuration protocol (such as Cisco's DHCP) upon boot-up. In either case, the host uses the same default gateway IP address for all network traffic destined to exit the local network.

To forward traffic to the default gateway, the host must perform an IP-ARP resolution to learn the data-link Media Access Control (MAC) address of the default gateway. The host sends an ARP inquiry to the IP address of the gateway, requesting the gateway's MAC address. The default gateway will respond to the host's ARP request by notifying the host of the gateway's MAC address. The host needs the default gateway's MAC address to forward network traffic to the gateway via a data-link layer transfer. When only a single gateway device is used, that device returns its own "burned in" MAC address (BIA MAC address) as the address for the host's outbound packets.

In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host cannot send packets outside of its LAN. This may be true even though there may be a redundant router able to take over, because the host does not know about the backup. Unfortunately, such systems have been used in mission critical applications.

The shortcomings of these early systems led to the development and implementation of redundant gateway systems, which provide for failover in gateway settings. One such system is the hot standby router protocol (HSRP) by Cisco Systems, Inc. of San Jose, Calif. A more detailed discussion of the earlier systems and of an HSRP type of system can be found in U.S. Pat. No. 5,473,599 (referred to herein as "the '599 patent"), entitled STANDBY ROUTER PROTOCOL, issued Dec. 5, 1995 to Cisco Systems, Inc., which is incorporated herein by reference in its entirety for all purposes. Also, HSRP is described in detail in RFC 2281, entitled "Cisco Hot Standby Router Protocol (HSRP)", by T. Li, B. Cole, P. Morton and D. Li, which is incorporated herein by reference in its entirety for all purposes.

HSRP is widely used to back up primary routers for a network segment. In HSRP, a "standby" router is designated as the backup to an "active" router. The standby router is linked to the network segment(s) serviced by the active router. The active and standby routers share a single "virtual IP address" and, possibly, a single "virtual Media Access Control (MAC) address" which is actually in use by only one router at a time. All internet communication from the relevant local network employs the virtual IP address (also referred to as a "vIP address") and the virtual MAC address (also referred to herein as a "vMAC address"). At any given time, the active router is the only router using the virtual address(es). Then, if the active router should cease operation for any reason, the standby router immediately takes over the failed router's load (by adopting the virtual addresses), allowing hosts to always direct data packets to an operational router without monitoring the routers of the network.

One drawback to HSRP systems in general is that only one gateway device in a redundancy group is in use at any given time. To better utilize system resources in such redundancy systems, a gateway load balancing protocol (GLBP) was developed by Cisco and is the subject of commonly owned and copending U.S. Ser. No. 09/883,674 filed Jun. 18, 2001, entitled GATEWAY LOAD BALANCING PROTOCOL, which is incorporated herein by reference in its entirety for all purposes.

It should be noted here that the term "gateway load balancing protocol" is somewhat of a misnomer (or at least is not as precise as it might be). While the members of a redundancy group share the traffic flow, there has been no "balancing" of the traffic loads, per se, across the gateway. It is true that sharing the traffic load among members of a redundancy group means that responsibility for all traffic is not borne by a single gateway device. However, the terms "load sharing"

and "load distribution" more accurately describe the actual implementations of these earlier systems. Therefore, the terms "load sharing" and "load distribution" and the like herein mean the ability to assign outgoing traffic to multiple gateway devices so that a single gateway device is not responsible for all outbound packets from all hosts on a LAN. (For the sake of reference to previously filed patent applications and other publications relied upon herein, the acronym GLBP will still be used herein to refer to the earlier, basic underlying load sharing protocol developed by Cisco Systems.)

Like HSRP, for communications directed outside of a LAN, GLBP uses a single vIP address shared by multiple redundancy group gateway devices (for example, routers), which also maintain actual IP addresses as well (also referred to as "aIP addresses"). Each gateway device also has its own BIA (actual) MAC address (also referred to herein as an "aMAC address") and a single virtual MAC address. Use of vMAC addresses allows interchangeability of routers without the need for reprogramming of the system.

Each GLBP system has a "master" gateway device (also referred to herein as an "Active Virtual Gateway" or AVG device) in the redundancy group that controls address assignment (ARP responses) and failover features. The AVG instructs an ARPing host to address outgoing communications to a virtual MAC address assigned to one of the redundancy group gateway devices (gateway devices not functioning as a master device may be referred to as "standby" and/or "slave" gateway devices, in accordance with standard GLBP nomenclature and operation). Any gateway device that is forwarding packets is referred to herein as an "Active Virtual Forwarder" or AVF device. Each redundancy group therefore has one AVG device and one or more AVF devices.

More specifically, a host sends an ARP message to the redundancy group's virtual IP address when the host wants to send a packet outside the local network. The AVG selects an AVF to handle outgoing packets for the host and sends the host a reply message containing the vMAC of the AVF selected by the AVG. The host populates its ARP cache with this vMAC address. Thereafter, the host addresses its outbound packets to the vMAC address in its ARP cache, thus sending these packets to the assigned AVF/router.

In earlier systems, hosts were assigned vMAC addresses by random assignment, round robin assignment or by using another prescribed algorithm or methodology. In the event that an assigned AVF of the group failed, the outgoing communications that were to be handled by the failed AVF had to be sent elsewhere. Upon failure of the originally assigned AVF, the failed AVF's vMAC address was re-assigned to another router, for example another router that is acting as an AVF. Thereafter, outgoing packets from the host (and any other host(s) which send packets to the re-assigned vMAC address) were routed instead to the new owner of that newly re-assigned vMAC address. In the event that the AVG itself failed, additional steps were taken to appoint or elect a new AVG and ensure continuity in the load distribution function. However, if one or more gateway devices took on an inordinate portion of the traffic load, there was no way to balance this load sharing capability to control distribution (evenly or otherwise) the traffic flow through gateway devices at the gateway.

In view of the foregoing, it would be desirable to provide gateway load balancing services for communications from outside a local network while ensuring that redundant, load sharing gateway services are still available for the local network.

SUMMARY OF THE INVENTION

The present invention provides methods, apparatus, products, techniques and systems for controlling the traffic flow across a gateway using multiple gateway devices that are acting as a virtual router. Gateway devices in a redundancy group share responsibility for outgoing packets from hosts through the distribution of forwarding addresses, such as virtual MAC addresses, to gateway devices to which hosts are directed in response to ARP requests.

One aspect of the present invention is a method of controlling traffic flow in a load-sharing redundancy group that includes a first gateway device and a second gateway device, where the gateway devices are configured to forward packets sent from hosts. One group of forwarding addresses is assigned to the first gateway device and a second group of forwarding addresses are assigned to the second gateway device. The redundancy group distributes forwarding addresses to hosts which in turn use the distributed forwarding addresses to send packets to the redundancy group. The traffic flow for each of the assigned forwarding addresses is measured and may, in some cases, be compared to a target traffic flow, which can be a desired traffic balancing among the redundancy group members. Comparison of the measured traffic flow to the target traffic flow may not be necessary in connection with some target traffic flows.

The traffic flow is then adjusted to close in on the target traffic flow. Adjustment of the traffic flow may be accomplished by changing the existing measured traffic flow (for example, by re-assigning a forwarding address having a certain measured traffic on a gateway device to a different gateway device) or by altering the future distribution of forwarding addresses so that additional traffic is sent to the forwarding addresses having lower measured traffic. The gateway devices can be routers using virtual MAC addresses as forwarding addresses. The redundancy group may also be configured to provide failover services in the event that one of the gateway devices ceases operation. A computer program product having a machine readable medium and program instructions contained in the machine readable medium, may specify one or more of these methods of controlling traffic flow in a load-sharing redundancy group. Similarly, an apparatus for performing such methods of controlling traffic flow in a load-sharing redundancy group also are disclosed.

Another aspect of the present invention pertains to a primary gateway device configured to control traffic flow in a load-sharing redundancy group having the primary gateway device and a secondary gateway device configured to forward packets sent from hosts. The primary gateway device has one or more processors and a memory in communication with at least one of the processors. A least one of the processors and the memory are configured to assign a first group of forwarding addresses to the primary gateway device and to assign a second plurality of forwarding addresses to the secondary gateway device. The primary gateway device distributes forwarding addresses to hosts which use the distributed forwarding addresses to send outgoing packets to the virtual gateway. The traffic flow for each assigned forwarding address in each gateway device is measured and may be compared to a target traffic flow in some cases. The traffic flow is then adjusted.

Adjustment of the traffic flow may be accomplished by the primary gateway device by changing the existing measured traffic flow (for example, by re-assigning a forwarding address having a certain measured traffic on a gateway device to a different gateway device) or by altering the future distribution of forwarding addresses so that additional traffic is sent to the forwarding addresses having lower measured traffic. The primary and secondary gateway devices can be routers using virtual MAC addresses as forwarding addresses. The redundancy group may also be configured to provide failover services in the event that one of the gateway devices ceases operation.

These and other features and advantages of the present invention will be presented in more detail in the following specification of the invention and the associated figures.

BRIEF DESCRIPTION OF THE DRAWINGS

The present invention may best be understood by reference to the following description taken in conjunction with the accompanying drawings in which:

FIG. 1B is a schematic diagram of the physical structure of the gateway service shown in FIG. 1A in which multiple gateway devices are used in a redundancy group to provide resiliency.

DETAILED DESCRIPTION OF THE EMBODIMENTS

1. Definitions

Figure 1A:
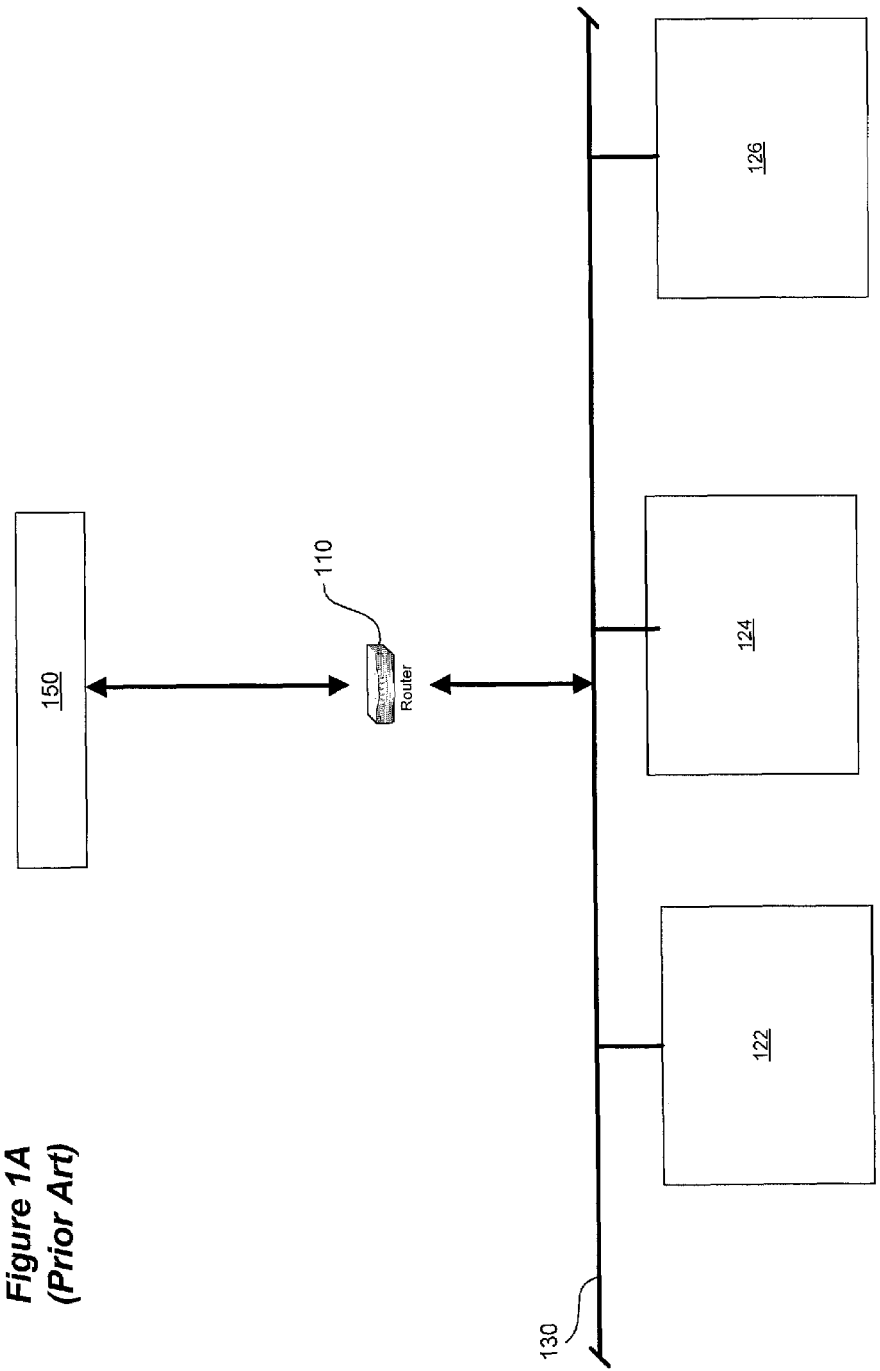
FIG. 1A is a schematic diagram of the logical structure a gateway service for hosts in a LAN.

Reference will now be made in detail to the preferred embodiment of the invention. An example of the preferred embodiment utilizing products, protocols, methods, systems and other technology developed, sold and/or used by Cisco Systems is illustrated in the accompanying drawings. While the invention will be described in conjunction with that preferred embodiment, it will be understood that it is not intended to limit the invention to one preferred embodiment or to its implementation solely in connection with Cisco products and systems. On the contrary, the following description is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following terms are used in the instant specification. Their definitions are provided to assist in understanding the preferred embodiments described herein, but do not necessarily limit the scope of the invention.

A "host" is a PC, or other arbitrary network entity residing on a LAN, that periodically communicates with network entities outside the LAN on which the host resides through a router or bridge. The term "user" may be used equivalently in this disclosure.

A "router" is a piece of hardware which operates at the network layer to direct packets between various LANs or WANs of a network. The network layer generally allows pairs of entities in a network to communicate with each other by finding a path through a series of connected nodes. Other terms that may be used in this disclosure include "layer 3 switch", "layer 3 device" and "gateway device" which are not necessarily the same as a router, but which may function in the same place and manner as a router. Any and all of these terms are intended to be interpreted as broadly as possible, unless specifically defined more narrowly.

An "IP (internet protocol) address" is a network layer address for a device operating in the IP suite of protocols. The IP address is typically a 32 bit field, at least a portion of which contains information corresponding to its particular network segment. Thus, the IP address of a router may change depending upon its location in a network. An IP address that is referred to as "unique" may be globally unique or may be sufficiently unique for the uses for which it is intended (for example, in a limited network environment in which globally unique IP addresses are unnecessary, but in which local IP addresses used on a local network are not sufficiently unique).

A "MAC address" is a data link layer device address, defined by the IEEE 802 committee that deals with issues specific to a particular type of LAN. The types of LANs for which MAC addresses are available include token ring, FDDI and Ethernet. A MAC address generally is intended to apply to a specific physical device no matter where it is plugged into the network. Thus, a MAC address generally is hardcoded into the device—on a router's ROM, for example. This should be distinguished from the case of a network layer address, described above, which changes depending upon where it is plugged into the network. Also, a real MAC address (such as a "burned in address" or BIA MAC address) can be distinguished from a "virtual address" (as defined below) which can include a virtual MAC address.

A "virtual address" is typically (but not necessarily) an address shared or able to be shared (for example, via portability of the address through re-assignment) by a group of real network entities, corresponding to a virtual entity. For example, in the context of this invention, one real router from among two or more real routers emulates a virtual router by adopting a virtual address (such as a virtual IP address), and another entity (usually a host) is configured to send data packets to such virtual address, regardless of which real router is currently emulating the virtual router. In the preferred embodiments, the virtual addresses may encompass both MAC and IP addresses. Usually, various members of the group each have the capability of adopting the virtual address(es) to emulate a virtual entity.

A "packet" is a collection of data and control information including source and destination node addresses, formatted for transmission from one node to another. In the context of this invention, it is important to note that hosts on one LAN send packets to hosts on another LAN through a router or bridge connecting the LANs.

2. Overview

Embodiments of the present invention use gateway devices each having been assigned a set of forwarding addresses each of which includes one or more forwarding addresses (for example, vMAC or other MAC addresses) to control distribution of traffic flow consisting of packets that are sent by hosts across multiple gateway devices that are functioning as one or more virtual gateways for communications outside a local subnet. One embodiment of the present invention uses re-assignment of a vMAC address from one gateway device to another to shift the traffic assigned to that vMAC address from the former gateway device to the latter. Another embodiment of the present invention uses the assignment of vMAC addresses during the Address Resolution Protocol (ARP) process to allocate more traffic to one or more vMAC addresses where higher traffic flow is desired. Other embodiments and variations of the present invention will be apparent to those skilled in the art after reading the present disclosure in connection with the Figures.

More specifically, the present invention can be used to control the distribution (for example, load balancing) of traffic loads among gateway devices that are members of a redundancy group sharing a virtual IP address. Traffic flow data for the vMAC addresses is measured by a collector (for example, Cisco's Netflow, modified to maintain the number of data packets and bytes received for each virtual MAC address, rather than the group vIP address) which collects traffic flow data for packets received by the redundancy group's vIP address. This data can be shared among redundancy group gateway devices and adjustments can be made to achieve a target traffic flow that may include desired load sharing and/or distribution characteristics (for example, maintaining generally even balancing of traffic loads) based on the available traffic data. Those skilled in the art will appreciate that various data collection and data sharing techniques and apparatus can be used and different load sharing and balancing criteria applied to implement the present invention and thus are included within the scope of the present invention.

In one embodiment of the present invention, measured traffic flow data includes the rate of traffic on a per destination (that is, forwarding address, such as a vMAC or other MAC address) basis. Each gateway device may regularly poll its own traffic data collector 250 shown in FIG. 2 (or any other suitable traffic data collector, such as a single traffic data collector for all members of the redundancy group) to measure the traffic flow rate for each forwarding address that is assigned to that gateway device. Measured traffic flow data can be appended to GLBP Hello messages, or be sent to other gateway devices or a control gateway device (for example, the AVG) in any other suitable way. Thus, at any given time, at least one redundancy group router (or other gateway device) knows the measured traffic flow (that is, how much traffic is being sent to each forwarding address in the redundancy group).

Figure 2:
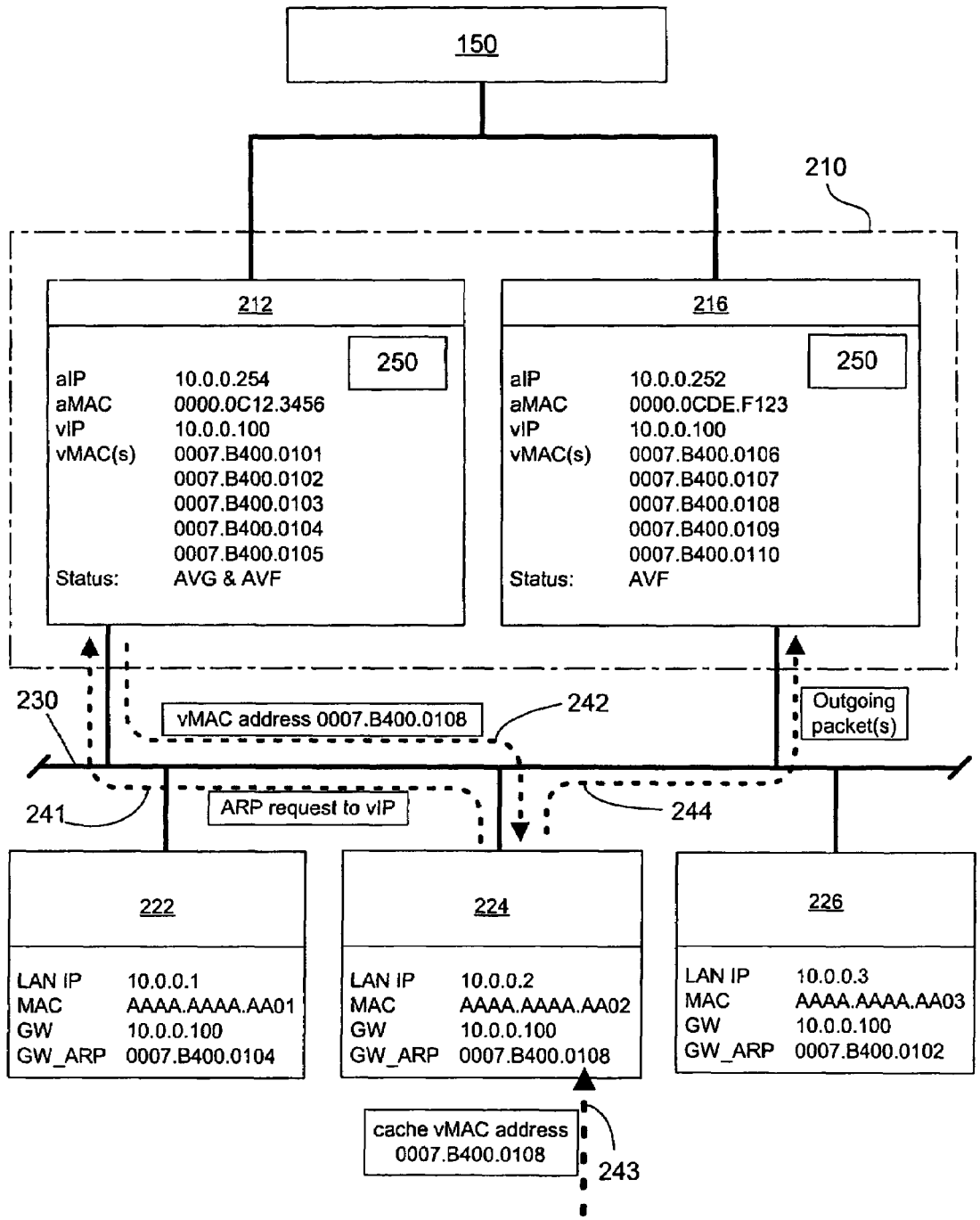
FIG. 2 is a schematic diagram of a virtual gateway in which several gateway devices are available to both direct traffic outside the local network and also to control traffic flow to the members of the redundancy group, using the present invention.

In an embodiment of the present invention shown in FIG. 2, the redundancy group is a GLBP group using routers 212, 216 as gateway devices (though expansion of the application of the present invention to redundancy groups having more than two gateway devices will be clearly apparent to those skilled in the art). Each router 212, 216 in the GLBP group is an AVF and initially is assigned a set of vMAC addresses. The vMAC addresses are used as forwarding addresses by hosts to which those forwarding addresses have been distributed in ARP replies. In prior systems, each AVF/gateway device had only been assigned a single vMAC address. In such prior systems, an AVF's vMAC address would be re-assigned (that is, transferred to a different gateway device) only after a trigger event that stopped the AVF from forwarding packets sent to it.

In the embodiment of the present invention shown in FIG. 2, by replying to ARP requests from hosts, the AVG 212 controls distribution of vMAC addresses to hosts using the virtual gateway implemented by redundancy group 210. Members of the redundancy group can be notified which router in the GLBP group is the AVG for that group using services and/or protocols known to those skilled in the art. When a new gateway device enters service, it can register with the AVG to receive an initial set of vMAC addresses. Other methods can be used to make initial vMAC address assignments, as will be appreciated by those skilled in the art.

As seen in FIG. 2, virtual gateway 210 is made up of two actual gateway devices (routers) 212 and 216. Each gateway device has an aIP address, an aMAC address and a set of two or more virtual MAC addresses (also referred to as vMAC addresses) used as forwarding addresses and initially assigned to the gateway device. The gateway devices in redundancy group 210 share vIP address 10.0.0.100. As illustrated, gateway device 212 uses aIP address 10.0.0.254, aMAC address 0000.0C12.3456 and 5 different vMAC addresses ranging from 0007.B400.0101 through 0007.B400.0105; gateway device 216 uses aIP address 10.0.0.252, aMAC address 0000.0CDE.F123 and 5 different vMAC addresses ranging from 0007.B400.0106 through 0007.B400.0110.

The local subnet 230 that virtual router 210 serves includes hosts 222, 224 and 226, which each have an IP address and a MAC address. For example, host 224 has an IP address of 10.0.0.2 and a MAC address of AAAA.AAAA.AA02. As with some prior GLBP systems, the hosts may have been pre-programmed with the gateway address of the virtual router, in this case 10.0.0.100. An ARP resolution protocol and apparatus similar to a standard Cisco GLBP system can be used in connection with the present invention.

As an illustration, when host 224 sends an ARP request, indicated by arrow step 241, to the gatewayIP address (for example, 10.0.0.100), only the AVG 212 responds, distributing one of the forwarding addresses currently assigned to gateway device 216 (for example, vMAC address 0007.B400.0108) to the requesting host 224, at step 242. At step 243, the host 224 caches this vMAC address as the MAC address that corresponds to the default gateway IP address, and then, at step 244, sends packets destined for a network outside the LAN to the cached vMAC address, which currently is assigned to gateway device 216.

As seen in FIG. 2, using similar ARP techniques, host 222 has cached vMAC address 0007.B400.104 (a vMAC address currently assigned to gateway device 212) and host 226 has cached vMAC address 0007.B400.0102 (a vMAC address also currently assigned to gateway device 212). Additional hosts, gateway devices and/or vMAC addresses can be included in such a configuration, as will be appreciated by those skilled in the art. Increasing the number of vMAC addresses per gateway device in a gateway improves the granularity of the load control of a given gateway, thus affording "finer tuning" of the control over a gateway's traffic load distribution.

The AVG may reply to ARP requests, distributing vMAC addresses to hosts, in various ways. For example, the AVG may initially use a round robin algorithm, random distribution algorithm or other technique or algorithm to distribute vMAC addresses to hosts as evenly as possible when initially replying to ARPs from hosts. As discussed below in more detail, the manner of allocating traffic to vMAC addresses may change over time or may remain the same. If vMAC addresses are distributed to hosts in ARP replies in a relatively even initial distribution, and each host is sending the same traffic load to its assigned vMAC address, then the traffic loads of the gateway devices and vMAC addresses illustrated in the example of FIG. 2 will be the same, as shown in Table 1.

TABLE 1

| Router 212 vMAC addresses | % Loads | Router 216 vMAC addresses | % Loads |
| --- | --- | --- | --- |
| 0007.B400.0101 | 10.0 | 0007.B400.0106 | 10.0 |
| 0007.B400.0102 | 10.0 | 0007.B400.0107 | 10.0 |
| 0007.B400.0103 | 10.0 | 0007.B400.0108 | 10.0 |
| 0007.B400.0104 | 10.0 | 0007.B400.0109 | 10.0 |
| 0007.B400.0105 | 10.0 | 0007.B400.0110 | 10.0 |
| Total | 50.0% | Total | 50.0% |

However, traffic loads may change over time. For example, some hosts may make heavier use of the gateway, some hosts may cease sending packets to their cached vMAC address(es), etc. As a result, one of the gateway devices (or, more precisely, one or more of the vMAC addresses assigned to the gateway device) in FIG. 2 may eventually be forwarding more traffic than another, one example of which is shown in Table 2.

TABLE 2

| Router 212 vMAC addresses | % Loads | Router 216 vMAC addresses | % Loads |
| --- | --- | --- | --- |
| 0007.B400.0101 | 20.0 | 0007.B400.0106 | 10.0 |
| 0007.B400.0102 | 13.0 | 0007.B400.0107 | 5.0 |
| 0007.B400.0103 | 15.0 | 0007.B400.0108 | 0.0 |
| 0007.B400.0104 | 15.0 | 0007.B400.0109 | 10.0 |
| 0007.B400.0105 | 7.0 | 0007.B400.0110 | 5.0 |
| Total | 70.0% | Total | 30.0% |

Figure 6:
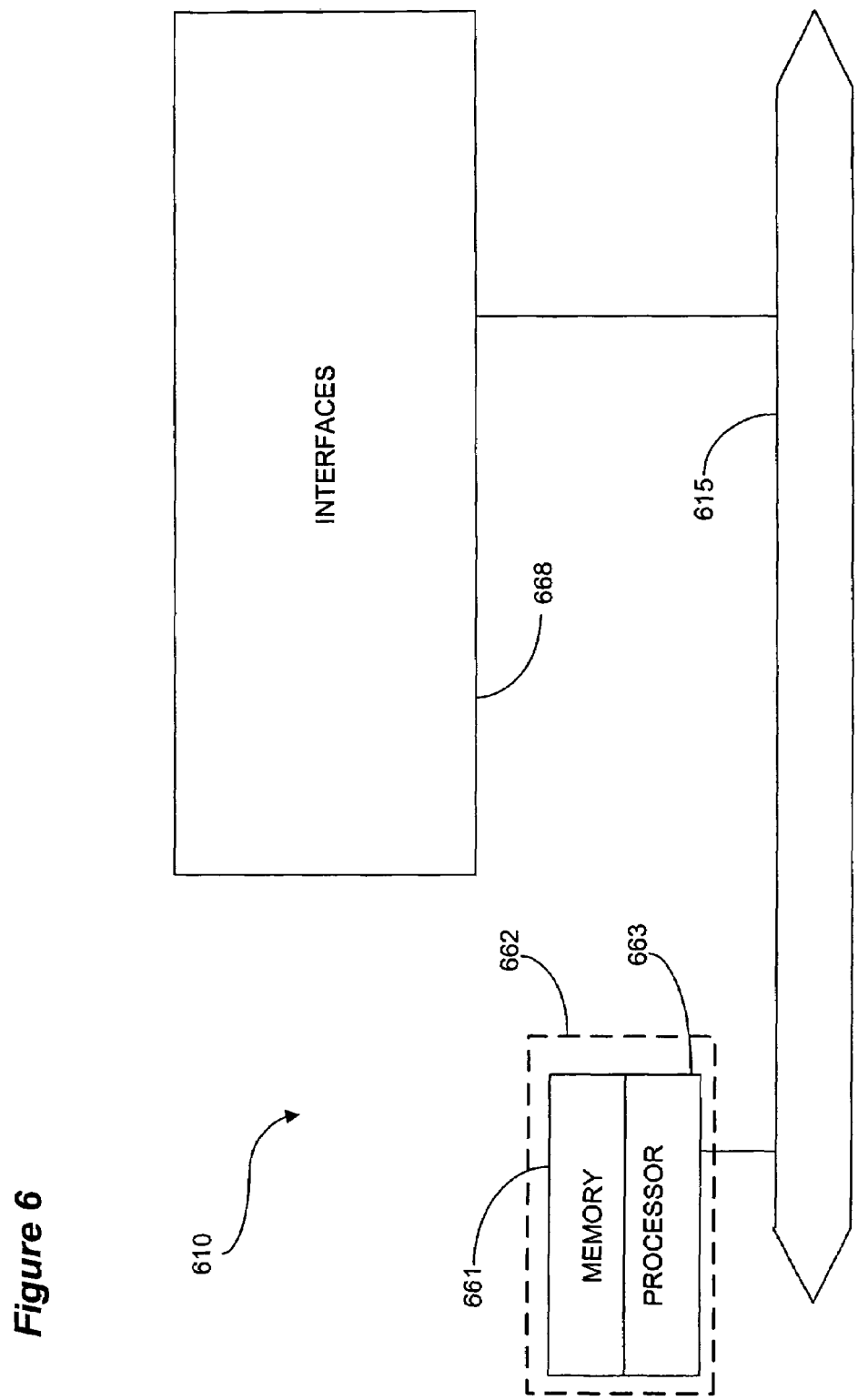
FIG. 6 is a diagrammatic representation of a gateway device such as a router in which embodiments of the present invention may be implemented.

One embodiment of the present invention compares the measured traffic flow to a target traffic flow and then adjusts the traffic flow by re-assigning one or more forwarding addresses from a higher traffic flow volume gateway device to a lower traffic flow volume gateway device to close in on or achieve a target traffic flow to the gateway devices making up the gateway. The comparison of the measured traffic flow and the target traffic flow can be performed in the AVG, an AVF or in a comparator outside the redundancy group. If re-assignment of forwarding addresses is being used to adjust the traffic flow of the redundancy group, then the comparison of the measured traffic flow and target traffic flow can be performed in the traffic flow data collector 250 of a gateway device (which may be, for example, a CPU 662 having a memory and processor, as seen in FIG. 6). Likewise, if adjustment of the traffic flow is performed, that can be performed in any of the embodiments of the present invention by the AVG, an AVF or any other suitable device in or outside the redundancy group, as will be appreciated by those skilled in the art. If equal distribution of traffic across all gateway devices in a virtual gateway is the target traffic flow, then the measured traffic flow presented in Table 2 can be altered in several ways.

Figure 3:
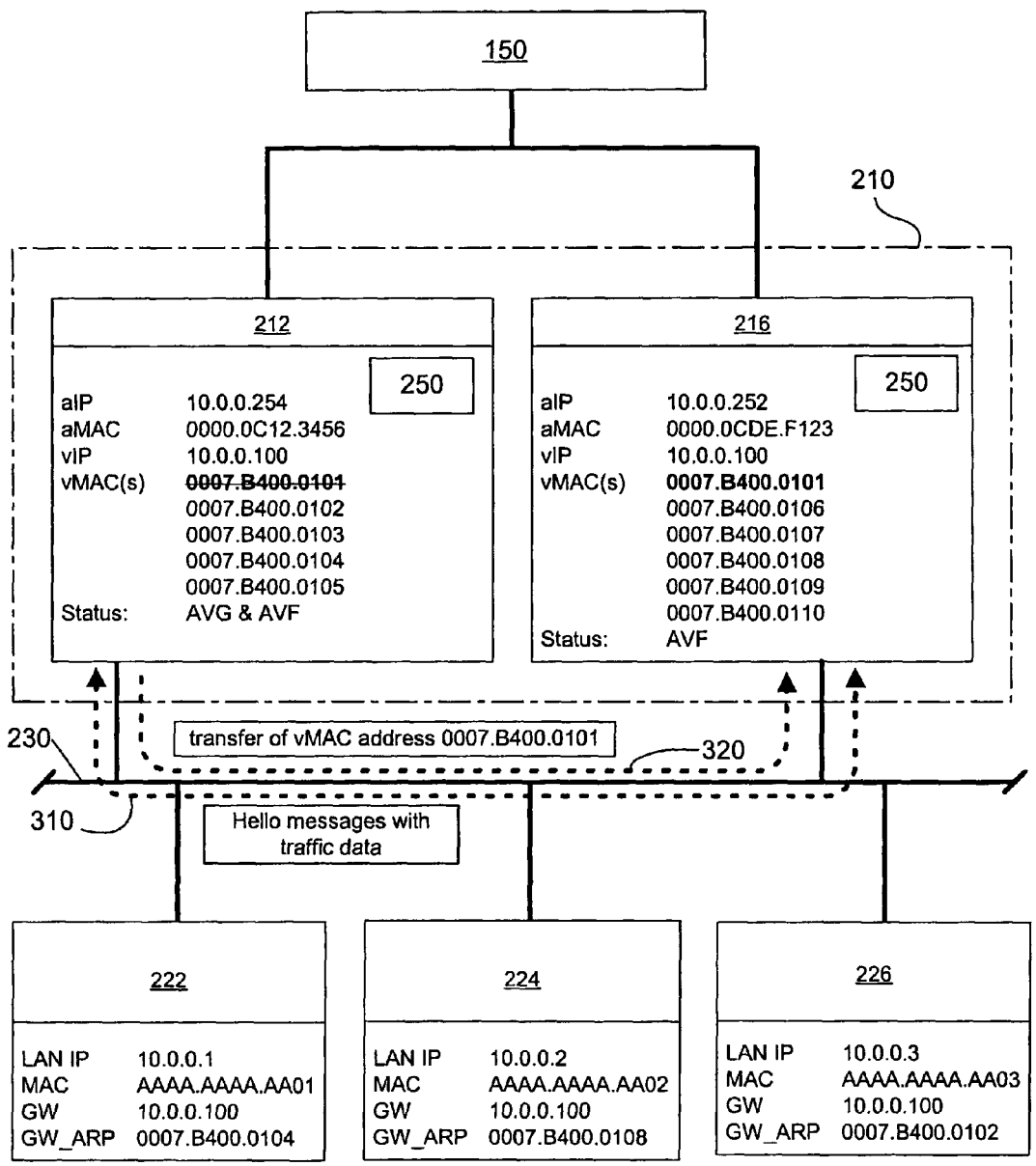
FIG. 3 is a schematic diagram showing adjustment of traffic flow in a virtual gateway by re-assignment of a forwarding address from one gateway device to a different gateway device.

According to one embodiment of the present invention, as seen in FIG. 3, traffic information or data (for example, traffic statistics collected on the GLBP interface that record the rate of traffic on a per destination MAC address basis so that the volume of traffic being sent to each vMAC address can be compared) is exchanged by the gateway devices 212, 216 by hello messages 310. Based on the data collected by and exchanged between the gateway devices (for example, by data collectors 250 in each gateway device 212, 216), the measured traffic flow can be adjusted by re-assigning address 0007.B400.0101 from the forwarding address set of gateway device 212 to the forwarding address set of gateway device 216 at step 320, yielding the vMAC address assignments and traffic load distribution shown in Table 3 and FIG. 3. This re-assignment of traffic to a lower volume gateway device is transparent to and does not affect the traffic being generated by the hosts 222, 224, 226 in FIG. 3 nor does re-assignment of the vMAC address affect the vMAC addresses cached in each host. Moreover, the AVG does not have to change its assignment algorithm or methodology since the traffic flow will be adjusted by re-assignment to compensate for future imbalance(s), if necessary.

TABLE 3

| Router 212 vMAC address | % Load | Router 216 vMAC address | % Load |
| --- | --- | --- | --- |
| ~~0007.B400.0101~~ | ~~20.0~~ → → | 0007.B400.0106 | 10.0 |
| 0007.B400.0102 | 13.0 ↓ | 0007.B400.0107 | 5.0 |
| 0007.B400.0103 | 15.0 ↓ | 0007.B400.0108 | 0.0 |
| 0007.B400.0104 | 15.0 ↓ | 0007.B400.0109 | 10.0 |
| 0007.B400.0105 | 7.0 ↓ | 0007.B400.0110 | 5.0 |
| | | → → → 0007.B400.0101 | 20.0 |
| Total | 50.0% | Total | 50.0% |

Figure 4:
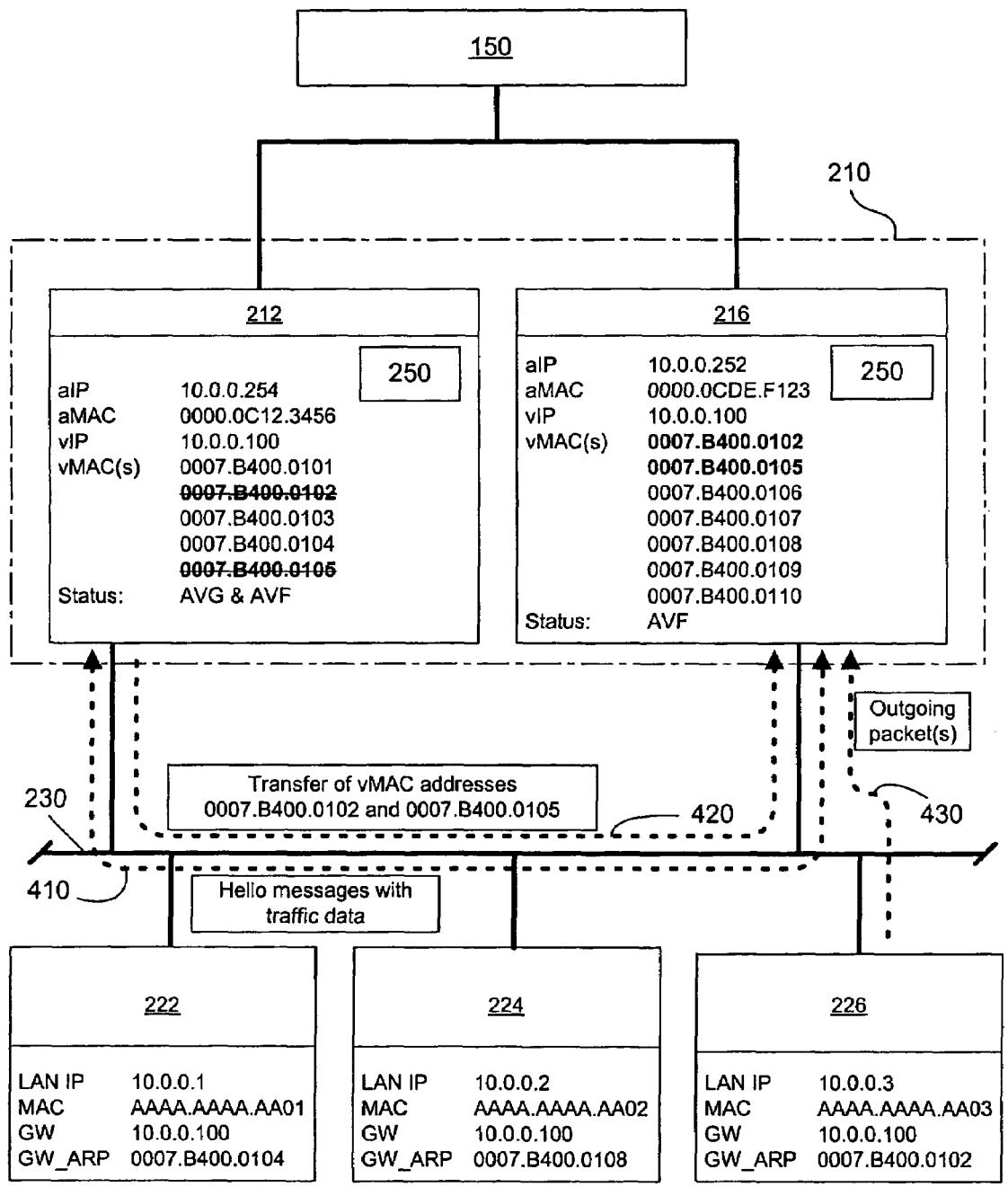
FIG. 4 is a schematic diagram showing adjustment of traffic flow in a virtual gateway by re-assignment of two forwarding addresses from one gateway device to a different gateway device.

Another embodiment of the present invention using vMAC address transfer to adjust traffic flow permits more flexibility with regard to future balancing. After exchanging traffic data at 410, as seen in FIG. 4, more than one vMAC address might be re-assigned at 420, for example vMAC addresses 0007.B400.0102 and 0007.B400.0105, thereby shifting 20% of the load to gateway device 216, but allowing for "finer tuning" of the load at a later time, should partial shifting back to gateway device 212 be desired. The resulting vMAC address assignments and measured traffic flow are shown in Table 4 and FIG. 4. In this case, shifting traffic to a lower volume gateway device means that packets sent by host 226 at step 430 will now be forwarded by gateway device 216, instead of gateway device 212, which previously had been forwarding the packets from host 226.

TABLE 4

| Router 212 vMAC address | % Load | Router 216 vMAC address | % Load |
| --- | --- | --- | --- |
| 0007.B400.0101 | 20.0 | 0007.B400.0106 | 10.0 |
| ~~0007.B400.0102~~ | ~~13.0~~ → → → | 0007.B400.0107 | 5.0 |
| 0007.B400.0103 | 15.0 ↓ | 0007.B400.0108 | 0.0 |
| 0007.B400.0104 | 15.0 ↓ | 0007.B400.0109 | 10.0 |
| ~~0007.B400.0105~~ | ~~7.0~~ → ↓ | 0007.B400.0110 | 5.0 |
| | ↓ → → | 0007.B400.0102 | 13.0 |
| | → → → → | 0007.B400.0105 | 7.0 |
| Total | 50.0% | Total | 50.0% |

In another embodiment of the present invention, the system can adjust the traffic flow by changing how forwarding addresses are distributed to hosts, rather than re-assigning one or more forwarding addresses to a different gateway device. In the examples shown in Tables 1 and 2 above, for example, the vMAC addresses in use thus remain assigned to the forwarding address sets in the gateway devices to which they were assigned originally. However, the ARP reply algorithm generates replies containing one or more forwarding addresses in the gateway devices to adjust the traffic flow. In other words, regardless of what algorithm or methodology might have been used for initial assignment of hosts to vMAC addresses, the ARP replies can be used to adjust the measured traffic flow by changing the destinations of future packets from one or more hosts.

Figure 5:
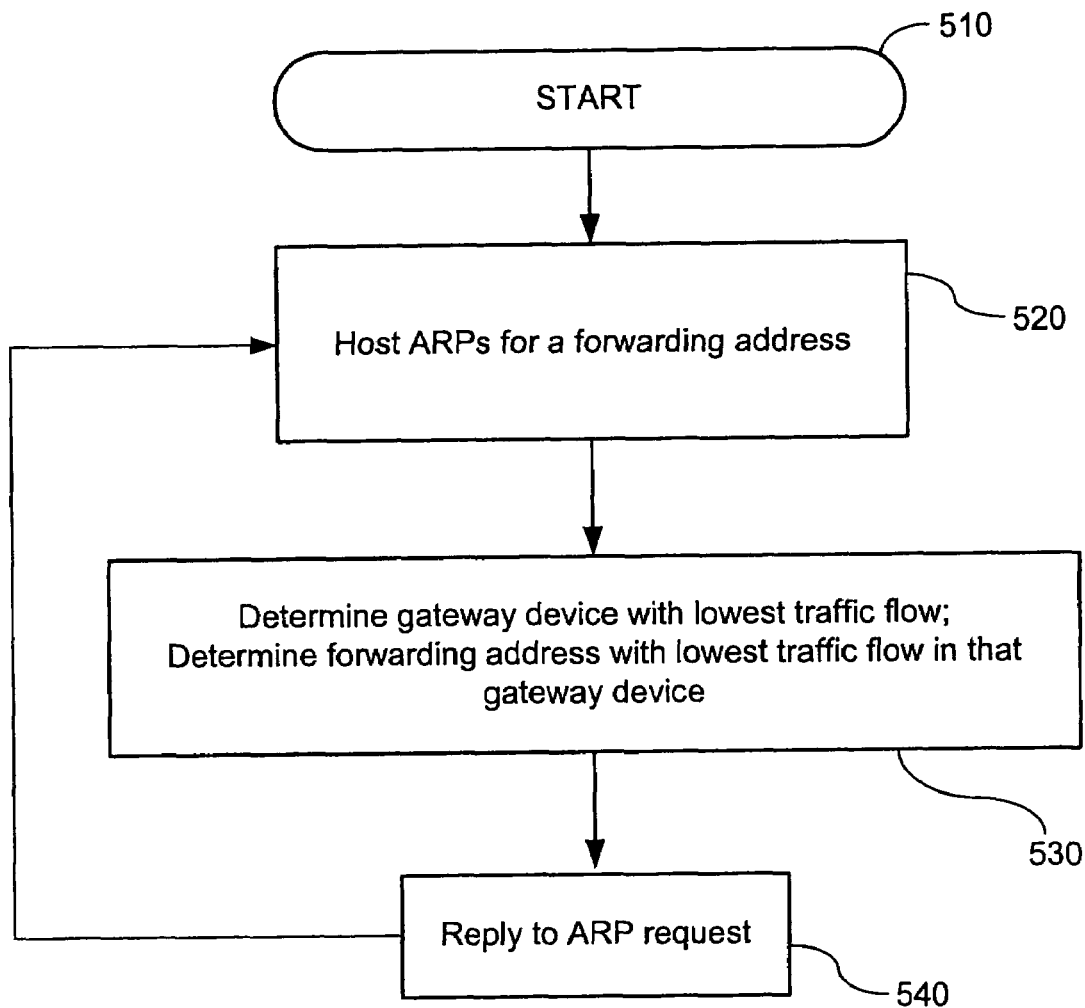
FIG. 5 is a schematic diagram showing adjustment of traffic flow in a virtual gateway by distribution of a low traffic flow forwarding address to hosts.

A generally equal traffic flow from the initial distribution of forwarding addresses to hosts can change as discussed in connection with Tables 1 and 2, above. Using the statistical data shown in Table 2, for example, and the method illustrated in FIG. 5, the traffic flow can be adjusted to correct a disparity between the measured traffic flow and the target traffic flow (here, equal distribution of traffic across both gateway devices 212, 216). The method starts at 510 with an existing measured traffic flow. Whenever a host ARPs at 520, the lowest traffic flow gateway device is found first at 530. The lowest traffic flow forwarding address is then found on that gateway device. The AVG responds to the host's ARP inquiry at 540 by replying with this "lowest percentage" forwarding address as the forwarding address to which the host should send outgoing packets.

In the case shown in Table 2, by responding to ARP requests with the vMAC address having the lowest traffic flow in the gateway device having the lowest traffic flow, in this case the AVG 212 would reply with vMAC address 0007.B400.0108 in AVF 216. The AVG 212 can continue using this forwarding address distribution algorithm or methodology until the measured traffic flows on gateway device 212 and gateway device 216 are within a prescribed percentage or threshold (for example, until the traffic load on each gateway device is at least 45% of the total traffic load). If new traffic is directed to vMAC address 0007.B400.0108, then measured traffic loads on one or more of the other vMAC addresses will decrease at least slightly as the newly distributed address gets more host traffic. The AVG 212 can continue adjusting the traffic flow by making such ARP assignments to close in on or maintain the target traffic flow.

As will be appreciated by those skilled in the art, this "low percentage" assignment method can be used from the outset of operation of the redundancy group 210 to build and maintain a generally equal distribution of traffic flow across a group of gateway devices. If the AVG always distributes the lowest traffic flow forwarding address in the lowest traffic flow gateway device, the system will be self-adjusting to some degree since it will be comparing the measured traffic flow with the target traffic flow whenever a host ARPs for a forwarding address and will adjust the traffic flow merely by distributing the "low percentage" forwarding address. If the measured traffic flow varies too greatly from the target traffic flow, then adjustment of the traffic flow by re-assignment of one or more vMAC addresses, as discussed above, can be used to correct a gross disparity. This hybrid of low percentage address distribution and corrective re-assignment is both simple and effective in establishing, maintaining and adjusting traffic flow to control that traffic flow in a redundancy group.

For example, the AVG may only assign new traffic to a vMAC address until the traffic load on that vMAC address surpasses the next lowest load on the lower volume gateway device. In FIG. 2, if the traffic load on vMAC address 0007.B400.0108 increases to a level above 5.0%, then the AVG may start replying to ARP requests with vMAC address 0007.B400.0107 or 0007.B400.0110, assuming their traffic flows are lower than that of 0007.B400.0108 and that the traffic flow across AVF 216 is still lower than AVG 212. This technique not only balances traffic loads between gateway devices 212 and 216, but also helps to balance the loads among the various vMAC addresses, if that is desired.

In embodiments where variances from the target traffic flow are addressed by distributing low traffic flow forwarding addresses, finer adjustment of the traffic flow can be achieved through the use of more forwarding addresses in each gateway device's forwarding address set. As will apparent to those skilled in the art, each gateway device can conceivably operate with only one forwarding address, provided that hosts regularly send ARP requests for the vIP address. If this is not the case, then adjustment of the traffic flow using re-assignment of forwarding addresses is more effective since correction can be made proactively as soon as an imbalance is detected rather than waiting for an ARP request from a host to begin traffic flow adjustment.

Various types of forwarding addresses will be apparent to those skilled in the art. vMAC addresses are desirable even in the simplest implementation due to the ease with which gateway devices can be replaced and/or added without the need for reprogramming the entire system with new MAC address information. A new gateway device is merely assigned a new set of forwarding addresses comprising one or more vMAC addresses at the time the gateway device is installed into the redundancy group. The use of multiple vMAC addresses in the redundancy group allows easy expansion of the number of gateway devices in the redundancy group and adjustments to operation of the group as well. The use of multiple vMAC addresses within each gateway device provides finer tuning and adjustment of the traffic distribution over the individual gateway devices without adding substantially to the complexity of the system.

Those skilled in the art will appreciate that the selection of a redundancy protocol for use in a given setting may be influenced by various considerations. Regardless of the protocol(s) selected, however, the present invention can be implemented in a virtual router group or other redundancy group by appropriate selection of the redundancy protocol and the requirements of the system so that the desired performance can be obtained.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Referring now to FIG. 6, a router 610 suitable for implementing the present invention includes a master central processing unit (CPU) 662, interfaces 668, and a bus 615 (for example, a PCI bus). When acting under the control of appropriate software or firmware, the CPU 662 is responsible for such router tasks as routing table computations and network management. It may also be responsible for network address translation, virtual gateway operations, etc. It preferably accomplishes all these functions under the control of software including an operating system (e.g., the Internet Operating System (IOS.RTM.) of Cisco Systems, Inc.) and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 610. In a preferred embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 610. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 6 is one preferred router of the present invention, it is by no means the only gateway device or router architecture on which the present invention can be implemented. For example, an architecture having a single processor that handles communications as well as routing computations, etc. can be used. Further, other types of interfaces and media can also be used with the router.

Regardless of the network device's configuration, it may employ one or more memories or memory modules (including memory 661) configured to store program instructions for the general-purpose network operations and address translation operations described herein. The program instructions may control the operation of an operating system and/or one or more applications, for example. The memory or memories may also be configured to store relevant state information, data structures, etc., such as the measured and target traffic flow data and forwarding addresses described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of controlling the distribution of traffic flow in a load-sharing redundancy group comprising a set of gateway devices including a first gateway device and a second gateway device which forward packets sent from hosts, the method comprising:

assigning a first plurality of forwarding addresses to the first gateway device;

assigning a second plurality of forwarding addresses to the second gateway device;

measuring the traffic flow for each of the assigned forwarding addresses; and adjusting the traffic flow by changing allocation of the forwarding addresses based upon the measured traffic flow;

wherein the load-sharing redundancy group provides failover services in the event that one of the gateway devices ceases operation;

wherein the first gateway device actively forwards packets addressed to the first plurality of forwarding addresses and the second gateway device actively forwards packets addressed to the second plurality of forwarding addresses.

2. The method of claim 1 wherein each forwarding address is a Media Access Control (MAC) address.

3. The method of claim 2 wherein each MAC address is a virtual Media Access Control (vMAC) address.

4. The method of claim 1 wherein adjusting the traffic flow comprises altering the distribution of forwarding addresses to hosts.

5. The method of claim 4 wherein altering the distribution of forwarding addresses to hosts comprises sending a reply in response to an Address Resolution Protocol (ARP) inquiry from at least one of the hosts, the reply instructing the at least one of the hosts to use a forwarding address having the lowest measured traffic flow on one of the set of gateway devices, the one of the set of gateway devices having the lowest measured traffic flow, wherein the forwarding address is one of the first plurality of forwarding addresses or one of the second plurality of forwarding addresses.

6. The method of claim 1 wherein adjusting the traffic flow comprises re-assigning a forwarding address to a different gateway device.

7. The method of claim 1 wherein the first gateway device is a first router and the second gateway device is a second router.

8. The method of claim 1, further comprising:
comparing the measured traffic flow to a target traffic flow;
wherein the target traffic flow is equal distribution of traffic across the first gateway device and the second gateway device and further wherein adjusting the traffic flow comprises adjusting the traffic flow across the first gateway device and the second gateway device to more equally distribute the measured traffic flow between the first gateway device and the second gateway device.

9. The method as recited in claim 1, further comprising:
identifying one of the set of gateway devices having the lowest traffic flow; and
identifying a forwarding address associated with the identified gateway device, wherein the identified forwarding address has the lowest measured traffic flow of all forwarding addresses associated with the identified gateway device.

10. The method as recited in claim 1, wherein adjusting the traffic flow is performed based upon the measured traffic flow for at least a portion of the assigned forwarding addresses.

11. The method as recited in claim 1, wherein adjusting the traffic flow is performed based upon the measured traffic flow for each of the assigned forwarding addresses.

12. The method as recited in claim 1, wherein adjusting the traffic flow comprises:
re-assigning at least one of the first plurality of forwarding addresses to the second gateway device, wherein after re-assigning the at least one of the first plurality of forwarding addresses is no longer assigned to the first gateway device.

13. The method as recited in claim 1, wherein the first gateway device and the second gateway device each operate as an Active Virtual Forwarder in accordance with the Gateway Load Balancing Protocol.

14. The method as recited in claim 1, wherein the first plurality of forwarding addresses is different from the second plurality of forwarding addresses.

15. A method of controlling traffic flow in a load-sharing redundancy group comprising a set of gateway devices including a first gateway device and a second gateway device which forward packets sent from hosts, the method comprising:
assigning a first address set to the first gateway device, wherein the first address set comprises a plurality of forwarding addresses, further wherein the first gateway device operates as a first active gateway to forward packets sent by hosts and addressed to forwarding addresses in the first address set;
assigning a second address set to the second gateway device, wherein the second address set comprises a plurality forwarding addresses, further wherein the second gateway device operates as a second active gateway to forward packets sent by hosts and addressed to forwarding addresses in the second address set;
measuring the traffic flow to each forwarding address;
adjusting the measured traffic flow by changing allocation of the forwarding addresses based upon the measured traffic flow;
wherein the load-sharing redundancy group provides failover services in the event that one of the gateway devices ceases operation.

16. The method of claim 15 wherein adjusting the traffic flow comprises instructing a host to use the assigned forwarding address having the lowest measured traffic flow on one of the set of gateway devices, the one of the set of gateway devices having the lowest measured traffic flow.

17. The method of claim 15 wherein the forwarding addresses are virtual Media Access Control (vMAC) addresses.

18. The method of claim 15 wherein the first gateway device is a first router and the second gateway device is a second router.

19. The method of claim 15 wherein adjusting the traffic flow comprises re-assigning one of the forwarding addresses from the first address set to the second address set.

20. The method as claim 15, wherein the first gateway device actively forwards packets simultaneously with the second gateway device, and wherein the second gateway device actively forwards packets simultaneously with the first gateway device.

21. The method as recited in claim 15, wherein the first gateway device and the second gateway device each operate as an Active Virtual Forwarder in accordance with the Gateway Load Balancing Protocol.

22. The method as recited in claim 15, wherein the first address set is different from the second address set.

23. A computer readable medium encoded with instructions executable by a computer, the instructions specifying a method of controlling traffic flow in a load-sharing redundancy group comprising a set of gateway devices including a first gateway device and a second gateway device which forward packets from hosts, the method comprising:
assigning a first plurality of forwarding addresses to the first gateway device, further wherein the first gateway device forwards packets sent by hosts and addressed to the first plurality of forwarding addresses;
assigning a second plurality of forwarding addresses to the second gateway device, further wherein the second gateway device forwards packets sent by hosts and addressed to the second plurality of forwarding addresses;
measuring the traffic flow for each of the assigned forwarding addresses; and
adjusting the traffic flow by changing allocation of the forwarding addresses based upon the measured traffic flow;
wherein the load-sharing redundancy group provides failover services in the event that one of the gateway devices ceases operation;
wherein the first gateway device actively forwards packets and the second gateway device actively forwards packets simultaneously with the first gateway device.

24. The computer readable medium of claim 23 wherein the load-sharing redundancy group implements Cisco Gateway Load Balancing Protocol (GLBP) and further wherein the first gateway device is a first router and the second gateway device is a second router.

25. The computer readable medium of claim 23 wherein each forwarding address is a Media Access Control (MAC) address.

26. The computer readable medium of claim 25 wherein each Media Access Control (MAC) address is a virtual Media Access Control (vMAC) address.

27. The computer readable medium of claim 23 wherein adjusting the traffic flow comprises altering the distribution of forwarding addresses to hosts.

28. The computer readable medium of claim 27 wherein altering the distribution of forwarding addresses to hosts comprises replying to Address Resolution Protocol (ARP) inquiries from hosts using the forwarding address having the lowest measured traffic flow on one of the set of gateway devices, the one of the set of gateway devices having the lowest measured traffic flow.

29. The computer readable medium of claim 23 wherein adjusting the traffic flow comprises re-assigning a forwarding address to a different gateway device.

30. The computer readable medium of claim 23, the method further comprising:
   comparing the measured traffic flow to a target traffic flow;
   wherein the target traffic flow is equal distribution of traffic across the first gateway device and the second gateway device and further wherein adjusting the traffic flow comprises adjusting the traffic flow across the first gateway device and the second gateway device to more equally distribute the measured traffic flow between the first gateway device and the second gateway device.

31. An apparatus for controlling traffic flow in a load-sharing redundancy group comprising a set of gateway devices including a first gateway device and a second gateway device which forward packets sent from hosts, the apparatus comprising:
   means for assigning a first plurality of forwarding addresses to the first gateway device, further wherein the first gateway device forwards packets sent by hosts and addressed to the first plurality of forwarding addresses;
   means for assigning a second plurality of forwarding addresses to the second gateway device, further wherein the second gateway device forwards packets sent by hosts and addressed to the second plurality of forwarding addresses;
   means for measuring the traffic flow for each of the assigned forwarding addresses; and
   means for adjusting the traffic flow by changing allocation of the forwarding addresses based upon the measured traffic flow;
   wherein the load-sharing redundancy group provides failover services in the event that one of the gateway devices ceases operation,
   wherein the first gateway device actively forwards packets simultaneously with the second gateway device, and the second gateway device actively forwards packets simultaneously with the first gateway device.

32. The apparatus of claim 31 wherein the means for adjusting the traffic flow comprises means for altering the distribution of forwarding addresses to hosts.

33. The apparatus of claim 32 wherein the means for altering the distribution of forwarding addresses to hosts comprises means for replying to Address Resolution Protocol (ARP) inquiries from hosts such that the hosts are instructed to use the forwarding address having the lowest measured traffic flow on one of the set of gateway devices, the one of the set of gateway devices having the lowest measured traffic flow.

34. The apparatus of claim 31 wherein the means for adjusting the traffic flow comprises means for re-assigning a forwarding address to a different gateway device.

35. The apparatus of claim 31, further comprising:
   means for comparing the measured traffic flow to a target traffic flow;
   wherein the target traffic flow is equal distribution of traffic across the first gateway device and the second gateway device and further wherein the means for adjusting the traffic flow comprises means for adjusting the traffic flow across the first gateway device and the second gateway device to more equally distribute the measured traffic flow between the first gateway device and the second gateway device.

36. A primary gateway device controlling traffic flow in a load-sharing redundancy group comprising a set of gateway devices including the primary gateway device and a second gateway device which forward packets sent from hosts, the primary gateway device comprising:
   one or more processors;
   a memory in communication with at least one of the processors, wherein at least one of the processors and the memory:
   assign a first plurality of forwarding addresses to the primary gateway device, further wherein the primary gateway device forwards packets sent by hosts and addressed to the first plurality of forwarding addresses;
   assign a second plurality of forwarding addresses to the second gateway device, further wherein the second gateway device forwards packets sent by hosts and addressed to the second plurality of forwarding addresses;
       measure the traffic flow for each of the assigned forwarding addresses in the primary gateway device and the second gateway device; and
       adjust the traffic flow by changing allocation of the forwarding addresses;
   wherein the load-sharing redundancy group provides failover services in the event that one of the gateway devices ceases operation;
   wherein the first gateway device actively forwards packets simultaneously with the second gateway device, and the second gateway device actively forwards packets simultaneously with the first gateway device.

37. The primary gateway device of claim 36 wherein each forwarding address is a Media Access Control (MAC) address.

38. The primary gateway device of claim 37 wherein each Media Access Control (MAC) address is a virtual Media Access Control (vMAC) address.

39. The primary gateway device of claim 36 wherein adjusting the traffic flow comprises altering the distribution of forwarding addresses to hosts.

40. The primary gateway device of claim 39 wherein altering the distribution of forwarding addresses to hosts comprises replying to Address Resolution Protocol (ARP) inquiries from hosts, wherein replying includes instructing the hosts to use the forwarding address having the lowest measured traffic flow on one of the set of gateway devices, the one of the set of gateway devices having the lowest measured traffic flow.

41. The primary gateway device of claim 36 wherein adjusting the traffic flow comprises re-assigning a forwarding address to a different gateway device.

42. The primary gateway device of claim 36 wherein the primary gateway device is a first router and the second gateway device is a second router.

43. The primary gateway device of claim 36, wherein at least one of the processors and the memory:
   compare the measured traffic flow to a target traffic flow;
   wherein the target traffic flow is equal distribution of traffic across the primary gateway device and the second gateway device and further wherein adjusting the traffic flow comprises adjusting the traffic flow across the primary gateway device and the second gateway device to more equally distribute the measured traffic flow between the primary gateway device and the second gateway device.

44. The primary gateway device as recited in claim 36, wherein the primary gateway device operates as an Active Virtual Forwarder in accordance with the Gateway Load Balancing Protocol.

45. A primary gateway device controlling traffic flow in a load-sharing redundancy group comprising a set of gateway devices including the primary gateway device and a second gateway device which forward packets sent from hosts, the gateway device comprising:

one or more processors;

a memory in communication with at least one of the processors, wherein at least one of the processors and the memory:

assign a first address set to the primary gateway device, wherein the first address set comprises a plurality of forwarding addresses, further wherein the primary gateway device forwards packets sent by hosts and addressed to forwarding addresses in the first address set;

assign a second address set to the second gateway device, wherein the second address set comprises a plurality forwarding addresses, further wherein the second gateway device forwards packets sent by hosts and addressed to forwarding addresses in the second address set;

measure the traffic flow to each forwarding address; and adjust the measured traffic flow by changing allocation of the forwarding addresses;

wherein the load-sharing redundancy group provides failover services in the event that one of the gateway devices ceases operation;

wherein both the first gateway device and the second gateway device forward packets at a given point in time.

46. The primary gateway device of claim 45 wherein adjusting the traffic flow comprises instructing a host to use the assigned forwarding address having the lowest measured traffic flow on one of the set of gateway devices, the one of the set of gateway devices having the lowest measured traffic flow.

47. The primary gateway device of claim 45 wherein the forwarding addresses are virtual Media Access Control (vMAC) addresses.

48. The primary gateway device of claim 45 wherein the primary gateway device is a first router and the second gateway device is a second router.

49. The primary gateway device of claim 45 wherein adjusting the traffic flow comprises re-assigning one of the forwarding addresses from the first address set to the second address set.

* * * * *